US006678739B1

(12) United States Patent
Muraoka

(10) Patent No.: US 6,678,739 B1
(45) Date of Patent: Jan. 13, 2004

(54) SYSTEM, METHOD, AND COMPUTER PROGRAM PRODUCT FOR COMPRESSING TEST PATTERN SET

(75) Inventor: Hiroyuki Muraoka, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/573,359

(22) Filed: May 18, 2000

(30) Foreign Application Priority Data

May 19, 1999 (JP) ............................................ 11-139144

(51) Int. Cl.[7] .............................................. G06F 13/00
(52) U.S. Cl. ............................ 709/247; 714/33; 714/36
(58) Field of Search ................................ 709/203, 297, 709/313; 714/25, 32, 33, 36, 37

(56) References Cited

U.S. PATENT DOCUMENTS 5,719,881 A * 2/1998 Yonetoku ..................... 371/27
6,334,199 B1 * 12/2001 Ono et al. ................... 714/728

FOREIGN PATENT DOCUMENTS

| JP | 08-212799 | | 8/1996 |
| JP | 09-318711 | * | 12/1997 |
| JP | 11-052030 | * | 2/1999 |

OTHER PUBLICATIONS

Schulz et al.; "Socrates: A Highly Efficient Automatic Test Pattern Generation System"; 1987 International Test Conference; 11 Sheets.

* cited by examiner

Primary Examiner—Viet D. Vu
(74) Attorney, Agent, or Firm—Foley & Lardner

(57) ABSTRACT

A method for compressing a test pattern set including test patterns arranged in a specific order to detect faults in a logic circuit is provided, which compresses efficiently (i.e., at high compressibility) the test pattern sets of the logic circuits. The method is comprised of (a) rearranging the order of the test patterns included in the test pattern to be in ascending order of a number of undefined values included in each of the patterns; (b) assigning a defined value to the respective undefined values included in each of the patterns, sensitizing the undefined values; the patterns with the sensitized undefined values containing a fault-undetectable pattern or patterns and a fault-detectable pattern or patterns for the logic circuit; (c) removing the fault-undetectable pattern or patterns from the set; (d) assigning an undefined value to a parameter unnecessary to fault detection in the fault-detectable pattern or patterns; and (e) merging some of the fault-detectable patterns that are mergeable together according to a specific rule. The test pattern set can be compressed at high speed.

10 Claims, 26 Drawing Sheets

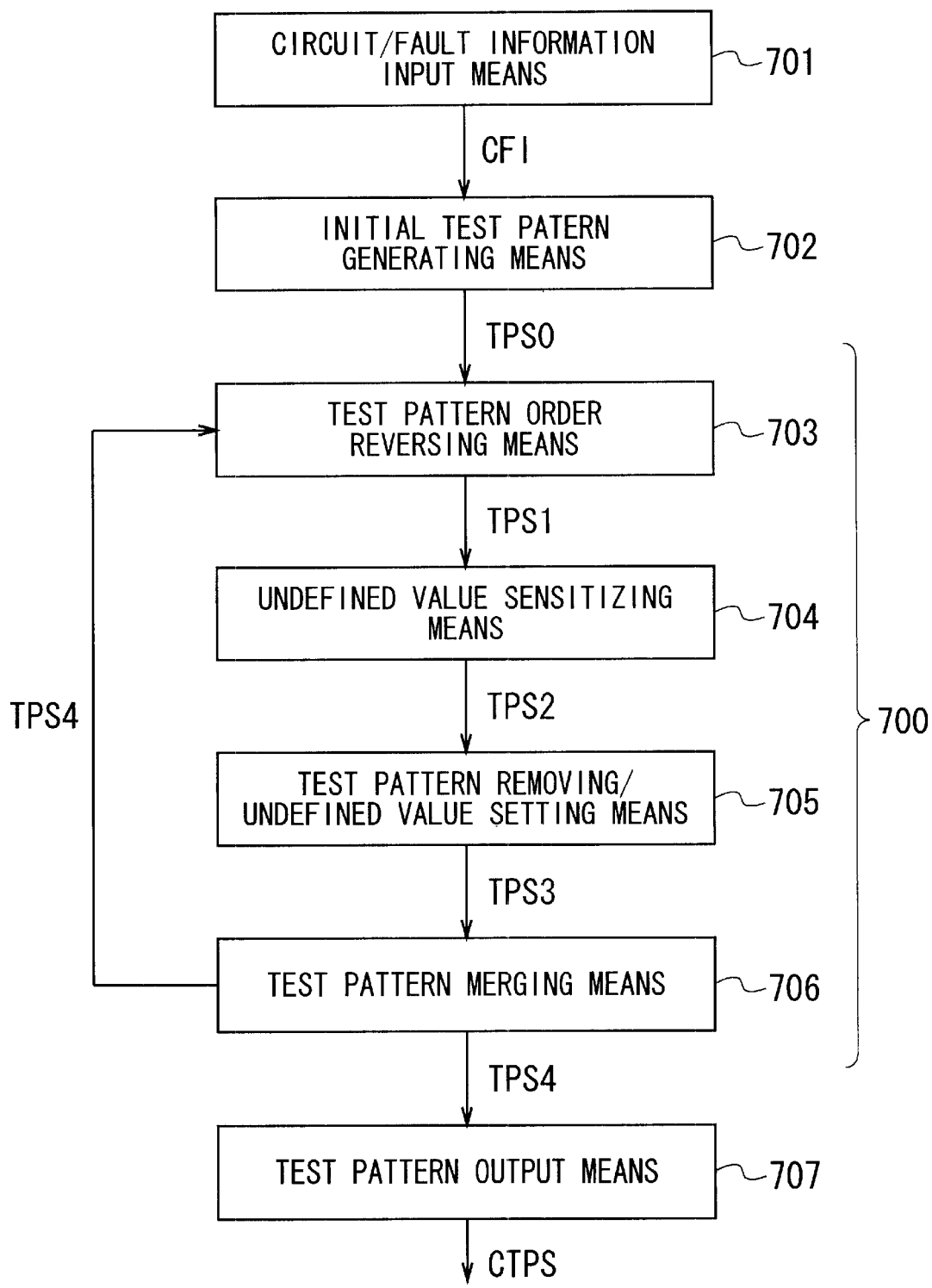

| | NECESSARY INPUT SIGNALS TO DETECTING FAULTS | | | | | NECESSARY INPUT SIGNALS TO DETECTING FAULTS F1~F5 |
|---|---|---|---|---|---|---|
| | FAULT F1 | FAULT F2 | FAULT F3 | FAULT F4 | FAULT F5 | |
| IS1 | | | | | ▨ | ▨ |
| IS2 | ▨ | | | | | ▨ |
| IS3 | | | | | | |
| IS4 | | ▨ | | | | ▨ |
| IS5 | | | | | | |
| IS6 | ▨ | | | | | ▨ |
| IS7 | ▨ | | | | | ▨ |
| IS8 | ▨ | | | | | ▨ |
| IS9 | | | | | | |
| IS10 | | | | ▨ | | ▨ |
| IS11 | | | | | | |
| IS12 | | | | ▨ | | ▨ |
| IS13 | | | | | | |
| IS14 | | | | | | |
| IS15 | | | ▨ | | | ▨ |
| IS16 | | | ▨ | | | |

INPUT SIGNALS

201

| | NECESSARY INPUT SIGNALS TO DETECTING FAULTS | | | | | NECESSARY INPUT SIGNALS TO DETECTING FAULTS F9~F10 |
|---|---|---|---|---|---|---|
| | FAULT F6 | FAULT F7 | FAULT F8 | FAULT F9 | FAULT F10 | |
| IS1 | | | | | | |
| IS2 | | | | | | |
| IS3 | | | | | | |
| IS4 | | | | | | |
| IS5 | | | | | | |
| IS6 | | | | | | |
| IS7 | | | | | | |
| IS8 | | | | | | |
| IS9 | | | | | | |
| IS10 | | ▨ | ▨ | | | ▨ |
| IS11 | | | | | ▨ | |
| IS12 | ▨ | | | ▨ | ▨ | ▨ |
| IS13 | | | | | | |
| IS14 | | | | | | |
| IS15 | | | | | | |
| IS16 | | | | | | |

| | | NECESSARY INPUT SIGNALS TO DETECTING FAULTS | | NECESSARY INPUT SIGNALS TO DETECTING FAULTS F11~F12 |
|---|---|---|---|---|
| | | FAULT F11 | FAULT F12 | |
| INPUT SIGNALS | IS1 | | ▨ | ▨ |
| | IS2 | | ▨ | ▨ |
| | IS3 | | ▨ | ▨ |
| | IS4 | | ▨ | ▨ |
| | IS5 | | ▨ | ▨ |
| | IS6 | | ▨ | ▨ |
| | IS7 | | ▨ | ▨ |
| | IS8 | | ▨ | ▨ |
| | IS9 | | ▨ | ▨ |
| | IS10 | | ▨ | ▨ |
| | IS11 | | ▨ | ▨ |
| | IS12 | ▨ | ▨ | ▨ |
| | IS13 | ▨ | | ▨ |
| | IS14 | | | |
| | IS15 | | ▨ | ▨ |
| | IS16 | | ▨ | ▨ |

| | NECESSARY INPUT SIGNALS TO DETECTING FAULTS | | NECESSARY INPUT SIGNALS TO DETECTING FAULTS F13~F14 |
|---|---|---|---|
| | FAULT F13 | FAULT F14 | |
| IS1 | | | |
| IS2 | | | |
| IS3 | | | |
| IS4 | | | |
| IS5 | | | |
| IS6 | | | |
| IS7 | | | |
| IS8 | | | |
| IS9 | | | |
| IS10 | | | |
| IS11 | | | |
| IS12 | ▨ | | ▨ |
| IS13 | ▨ | ▨ | |
| IS14 | | ▨ | ▨ |
| IS15 | | | |
| IS16 | | | |

INPUT SIGNALS

MARGING RULE
- "X" CAN BE MARGED WITH "1", "0", OR "X".
- "1" CAN BE MARGED WITH "1".
- "0" CAN BE MARGED WITH "0".
- "1" CANNOT BE MARGED WITH "0".

BEFORE MARGING

|     | IS1 | IS2 | IS3 | IS4 |
|-----|-----|-----|-----|-----|
| 301 | 1 | 0 | X | X |
| 302 | 1 | X | 1 | X |
| 303 | 0 | X | 1 | X |
| 304 | X | 1 | 1 | 0 |

|     | IS1 | IS2 | IS3 | IS4 |
|-----|-----|-----|-----|-----|
| 301 | 1 | 0 | X | X |
| 302 | 1 | X | 1 | X |
| 303 | 0 | X | 1 | X |
| 304 | X | 1 | 1 | 0 |

PATTERN 301 CAN BE MARGED WITH PATTERN 302

|     | IS1 | IS2 | IS3 | IS4 |
|-----|-----|-----|-----|-----|
| 305 | 1 | 0 | 1 | X |

|     | IS1 | IS2 | IS3 | IS4 |
|-----|-----|-----|-----|-----|
| 306 | 0 | 1 | 1 | 0 |

PATTERN 303 CAN BE MARGED WITH PATTERN 304

FIG. 14C

AFTER MARGING

|     | IS1 | IS2 | IS3 | IS4 |
|-----|-----|-----|-----|-----|
| 305 | 1 | 0 | 1 | X |
| 306 | 0 | 1 | 1 | 0 |

300'

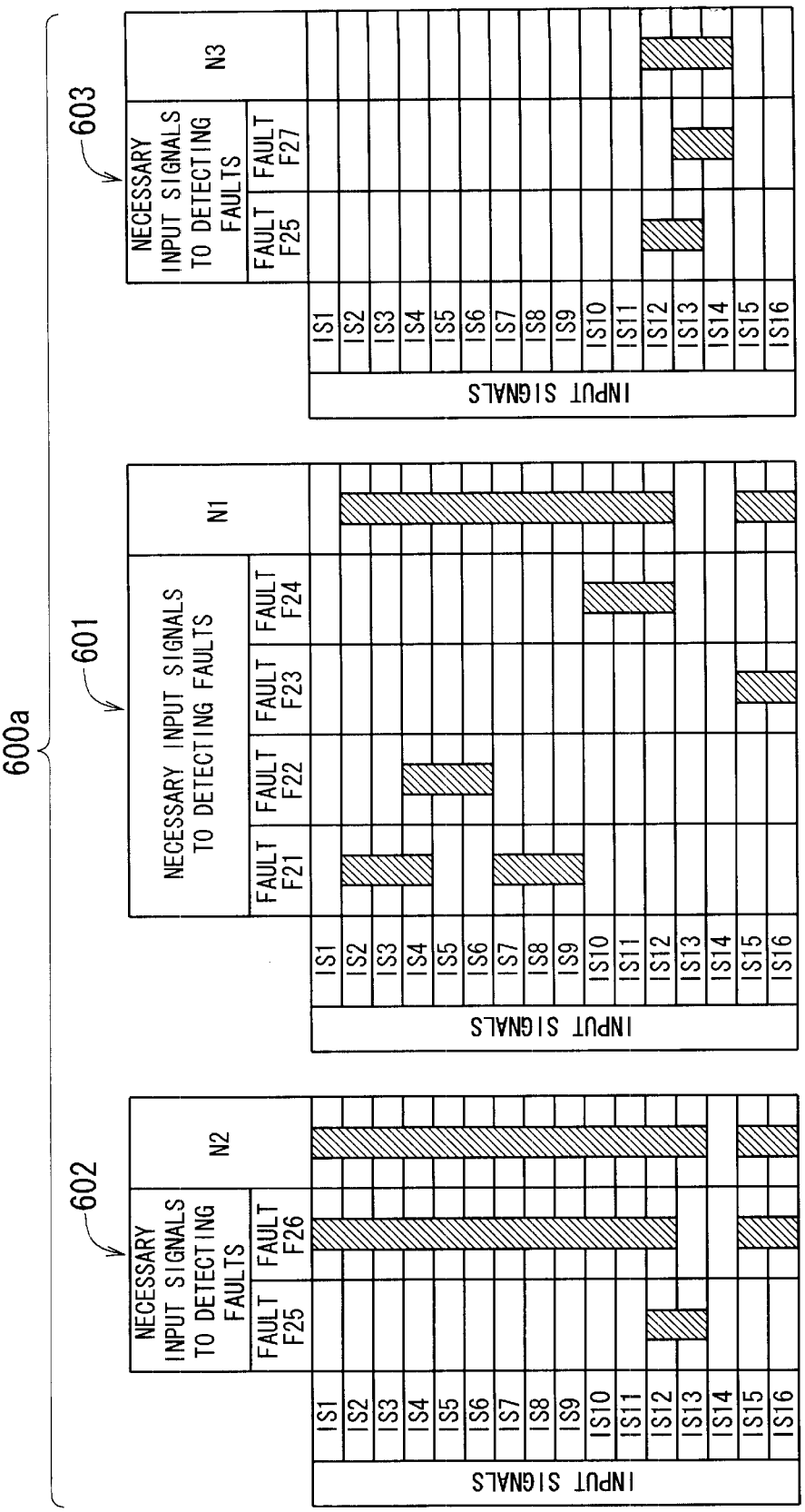

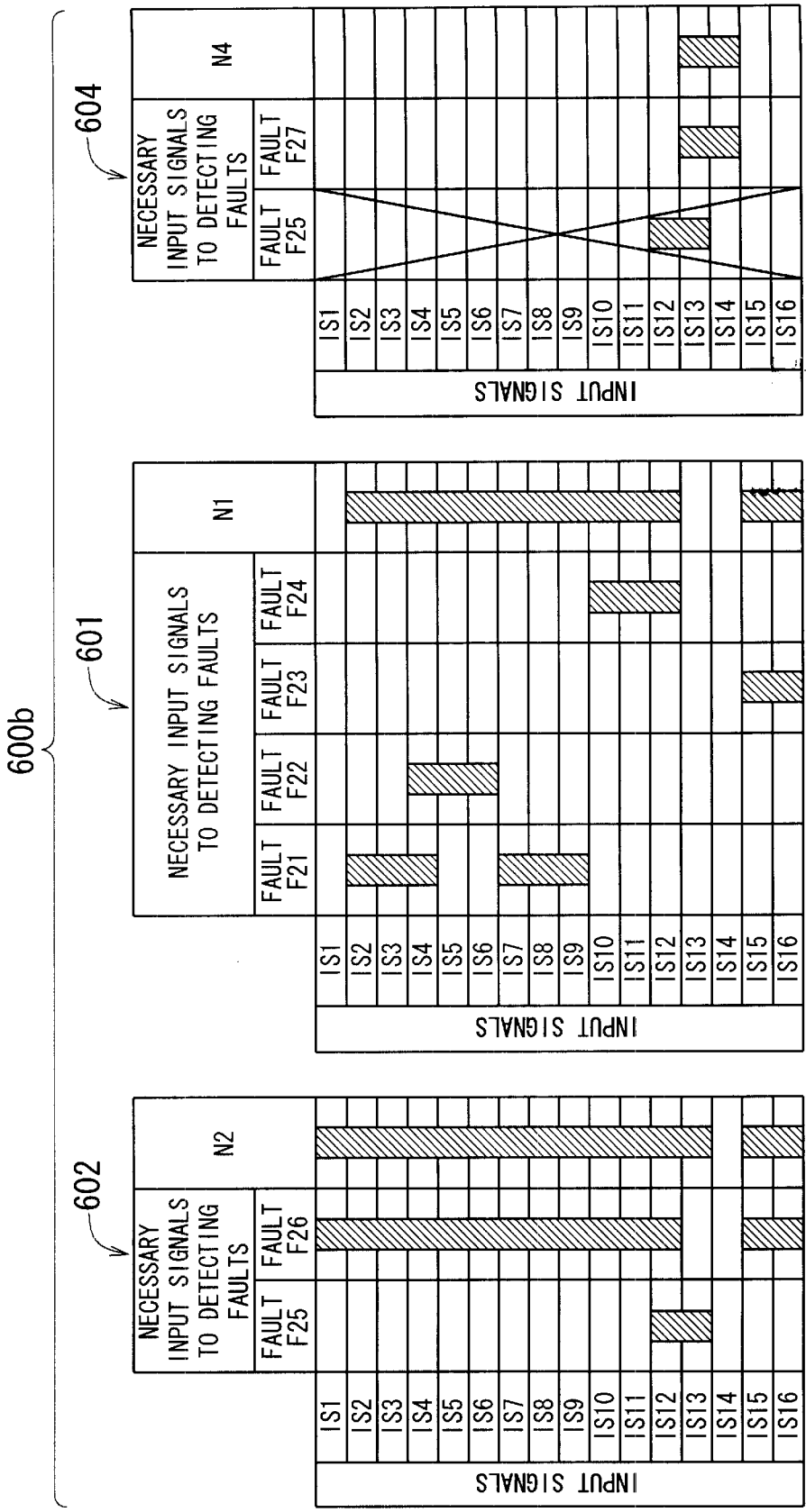

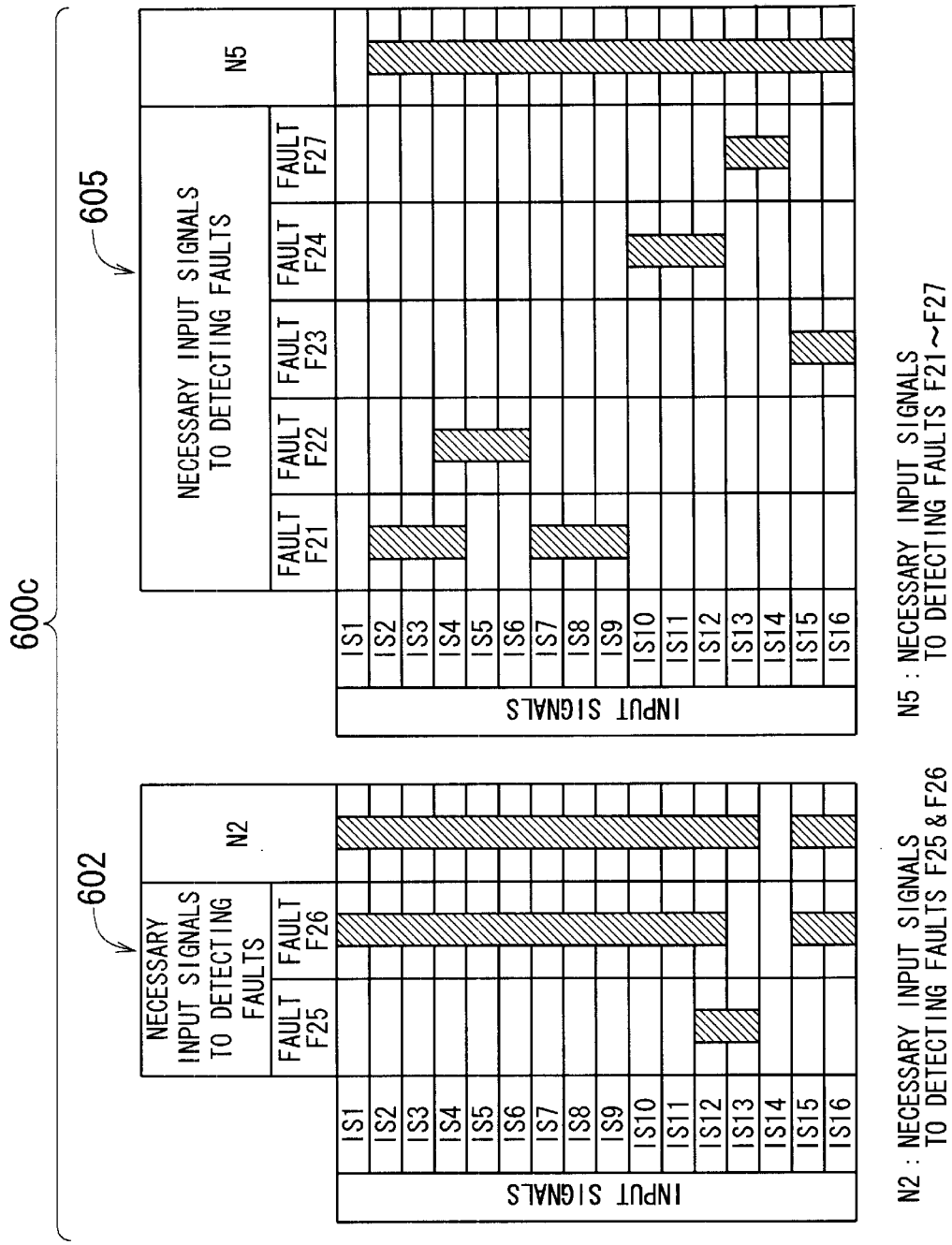

FIG. 16A

SYSTEM, METHOD, AND COMPUTER PROGRAM PRODUCT FOR COMPRESSING TEST PATTERN SET

BACKGROUND OF THE INVENTION

1. Field of the Invention

The present invention relates to test pattern compression applicable to fault detection of logic circuits and more particularly, to a system, a method, and a computer program product for compressing a test pattern set, which is applicable to fault detection of logic circuits.

2. Description of the Related Art

A test pattern set used for fault detection of logic circuits includes redundant test patterns and thus, "test pattern set compression" has been usually employed to decrease the number of test patterns included in a test pattern set without lowering the fault coverage.

To perform the "test pattern set compression", reverse order fault simulation, undefined value assignment to random numbers, and test pattern merging have ever been combined together and used. The reverse order fault simulation is as follows.

First, the initial order of test patterns included in a test pattern set for a logic circuit to be tested (i.e., a target logic circuit) is reversed, forming order-reversed test patterns in the set. Then, the operation of the target logic circuit is simulated using the order-reversed test patterns, specifying unnecessary test patterns in the set. Finally, the unnecessary patterns thus specified are removed or deleted from the set, resulting in compression of the set. The reverse order fault simulation is disclosed in, for example, a paper written by Michael H. Schultz et al., IEEE Trans. On CAD, pp. 126–137, January 1988, "SOCRATES: A HIGHLY EFFICIENT AUTOMATIC TEST PATTERN GENERATION SYSTEM".

FIG. 1 is a functional block diagram showing a prior-art test pattern set generator having a test pattern set compression system 700. The test pattern set generator in FIG. 1 comprises circuit/fault information input means 701, initial test pattern generating means 702, the test pattern set compression system 700, and test pattern output means 707. The test pattern set compression system 700 includes test pattern order reversing means 703, undefined value sensitizing means 704, test pattern removing/undefined value setting means 705, and test pattern merging means 706.

The circuit/fault information input means 701 fetches the information on the configuration and faults of the target logic circuit from the outside of the generator and the, sends it to the initial test pattern generating means 702. The information on the configuration and faults of the target logic circuit is termed the "circuit/fault information CFI" below.

The initial test pattern generating means 702 generates an initial test pattern set TPS0 (i.e., a test pattern set to be compressed) on the basis of the circuit/fault information CFI thus received. Then, the means 702 sends the initial test pattern set TPS0 thus generated to the test pattern order reversing means 703. The initial test pattern set TPS0 includes specific test patterns. Each of the patterns includes specific input signals applicable to the target logic circuit.

The test pattern order reversing means 703 reverses the order of the test patterns included in the initial test pattern set TPS0. Alternately, the means 703 reverses the order of the test patterns included in a fourth test pattern set TPS4 sent from the test pattern merging means 706 explained later. Thus, due to the order-reversing operation, the initial test pattern set TPS0 or the fourth test pattern set TPS 4 is converted to a first test pattern set TPS1. Then, the means 703 sends the first test pattern set TPS1 thus generated to the undefined value sensitizing means 704.

The undefined value sensitizing means 704 assigns the value of "0" or "1" (i.e., a low- or high-level logic signal) to the input signals of the respective test patterns in the first test pattern set TPS1 thus received. In other words, the undefined values of "X" contained in the set TSP1 are sensitized. Due to this sensitization of the undefined values, the set TSP1 is converted to a second test pattern set TPS2. The means 704 sends the second test pattern set TPS2 thus obtained to the test pattern removing/undefined value setting means 705. The sensitization of undefined values eliminates the undefined logic states in the target logic circuit when simulation is carried out and therefore, there arises a possibility that any other faults are detected.

The test pattern removing/undefined value setting means 705 extracts successively the test patterns included in the second test pattern set TPS2 thus received according to the order of the test patterns and then, simulation operations are successively carried out using the test patterns thus extracted. The means 705 identifies or specifies unnecessary test patterns from all the test patterns included in the second set TPS2 on the basis of the simulation result. If at least one unnecessary pattern is identified by the means 705, the at least one unnecessary test pattern thus identified is removed from the set TPS2. Also, the means 705 sets undefined values on the unnecessary input signals of the remaining test patterns in the set TPS2, respectively, thereby facilitating the test pattern merging. Thus, the second test pattern set TPS2 is converted to a third test pattern set TPS3. The set TPS3 thus formed is sent to the test pattern merging means 706.

The test pattern merging means 706 identifies two or more mergible test patterns from the test patterns in the third test pattern set TPS3 thus received. Then, the means 706 merges the two or more test patterns thus identified together to form a single test pattern, thereby converting the set TPS3 to a fourth test pattern set TPS4. The set TPS4 thus generated corresponds to the compressed one of the initial test pattern set TPS0.

Moreover, the test pattern merging means 706 makes a judgment whether or not the fourth test pattern set TPS4 should be further compressed under a predetermined condition. If the means 706 judges further compression necessary, the means 706 returns the set TPS4 to the test pattern order reversing means 703 and then, the means 703, 704, 705, and 706 compresses the set TPS4 again in the same way as performed for the initial test pattern set TPS0. If the means 706 judges further compression unnecessary, the means 706 sends the set TPS4 to the test pattern output means 707.

The test pattern output means 707 sends the fourth test pattern set TPS4 thus received to the outside of the prior-art test pattern set generator of FIG. 1 as a finally-compressed test pattern set CTPS.

The undefined value identification operation by the test pattern removing/undefined value setting means 705 and the test pattern merging operation by the test pattern merging means 706 may be performed by any known technique, for example, disclosed in the Japanese Non-Examined Patent Publication No. 8-212799 published in August 1996.

In the prior-art test pattern compression system 700, the operations of the test pattern order reversing means 703, the undefined value sensitizing means 704, the test pattern removing/undefined value setting means 705, and the test pattern merging means 706 are repeated until all the mergeable test patterns are merged. As a result, the number of the test patterns constituting the initial test pattern set TPPS0 is decreased, in other words, the set TPS0 is compressed.

With the prior-art test pattern compression system 700 in FIG. 1, the fault simulation is carried out while reversing the order of the test patterns in the initial test pattern set TPS0. Thus, the patterns unnecessary to fault detection (i.e., that are removable) are easily identified. Moreover, since the test pattern merging is performed while undefined values are assigned to the input signals necessary to fault detection, the unnecessary test patterns are easily merged. Thus, the test pattern compression function can be enhanced.

However the prior-art test pattern compression system 700 has the following disadvantages.

The first disadvantage of the system 700 is that the test pattern compression performance (e.g., compressibility) varies dependent on the order of the test patterns in the initial test pattern set TPS0. The second disadvantage of the system 700 is that unnecessary test patterns to fault detection in the initial test pattern set TPS0 are difficult to be identified due to side effects of the reverse order fault simulation and the random number assignment to the undefined values.

The first disadvantage of the system 700 is explained in detail below with reference to FIGS. 2A to 2C that show the relationship between the test patterns and the detectable faults in the fault simulation.

Here, it is supposed that a logic circuit to be simulated (i.e., a target logic circuit) includes four faults A, B, C, and D, in which a test pattern A is designed to detect the faults A and B, a test pattern B is designed to detect the faults A and C, and a test pattern C is designed to detect the faults C and D.

As shown in FIG. 2A, a test pattern set 801 includes the test patterns a, B, and C that are arranged in this order. When a fault simulation operation of the target logic circuit is carried out using the set 801, the test pattern A is used first. Thus, the faults A and B are detected, as shown by the arrows a1 and a2. The faults A and B thus detected are removed from the target faults.

Next, a fault simulation operation using the test pattern B is carried out and as a result, the fault C is detected, as shown by the arrow a3. The fault C thus detected is removed from the target faults. The fault B, which has already been removed from the target faults, may be detected in this operation using the test pattern B. This is shown by a broken line in FIG. 2A, which is applied to the following cases explained later.

Furthermore, a fault simulation operation using the test pattern C is carried out and as a result, the fault D is detected, as shown by the arrow a4. The fault D thus detected is removed from the target faults. The fault C, which has already been removed from the target faults, may be detected in this operation using the test pattern C. This is shown by a broken line in FIG. 2A.

As described above, when the test pattern set 801 in FIG. 2A is used, all the faults a, B, C, and D are unable to be detected until the fault simulation operations using the test patterns A, B, and C are completed. In other words, to detect all the faults A, B, C, and D, all the patterns A, B, and C are necessarily used for simulation. As a result, none of the patterns A, B, and C can be removed when the set 801 is used.

FIG. 2B shows a test pattern set 802 that includes the test patterns C, B, and A arranged in this order. The set 802 corresponds to one obtained by reversing the order of the test patterns A, B, and C in the set 801 of FIG. 2A.

First, a fault simulation operation using the test pattern C is carried out and as a result, the faults C and D are detected, as shown by the arrows b1 and b2. The faults C and D are removed from the target faults.

Next, a fault simulation operation using the test pattern B is carried out and the fault A is detected, as shown by the arrow b3. The fault A is removed from the target faults.

Finally, a fault simulation operation using the test pattern A is carried out and the fault B is detected, as shown by the arrow b4. The fault B is removed from the target faults.

As described above, when the test pattern set 802 in FIG. 2B is used, all the faults A, B, C, and D are unable to be detected until the fault simulation operations using the test patterns C, B, and A are completed. This is the same as the case using the test pattern set 801. As a result, none of the patterns A, B, and C can be removed when the set 802 is used.

FIG. 2C shows a test pattern set 803 that includes the test patterns C, A, and B arranged in this order. When the set 803 is used, unlike the above two cases using the sets 801 and 802, unnecessary test patterns can be identified.

First, a fault simulation operation using the test pattern C is carried out and as a result, the faults C and D are detected, as shown by the arrows c1 and c2. The faults C and D are excluded from the target faults.

Next, a fault simulation operation using the test pattern A is carried out and the faults A and B are detected, as shown by the arrows c3 and c4. The faults A and B are excluded from the target faults. At this time, all the faults A, B, C, and D can be detected. Thus, the pattern B is identified as an unnecessary pattern and can be removed from the target faults when the set 803 is used.

As seen from the above explanation using the test pattern sets 801, 802, and 803 in FIGS. 2A to 2C, unnecessary test patterns can be or cannot be identified according to the order difference of the test patterns A, B, and C in the sets 801, 802, and 803. Also, as seen from the cases using the sets 801 and 802 in FIGS. 2A and 2B, unnecessary test patterns are difficult to be identified by simply reversing the order of the patterns A, B, and C. In other words, there is a possibility that unnecessary patterns cannot be identified even if fault simulation operations are performed while reversing the order of the patterns A, B, and C. Whether or not unnecessary patterns are identified is determined dependent on the order of the patterns in the initial test pattern set TPS0. Thus, the compression performance of a test pattern set varies dependent on the order of the test patterns in the set that are generated by the initial test pattern generating means 702.

The second disadvantage of the prior-art test pattern compression system 700 due to the side effects of the reverse order fault simulation and the random number assignment to the undefined values is explained in detail below with reference to FIGS. 3A to 3D.

As already explained above, when the initial test pattern set TPS0 is sent from the initial test pattern generating means 702 to the test pattern order reversing means 703, the reversing means 703 reverses the order of the test patterns contained in the set TPS0 to form the first test pattern set TPS1 and then, the means 703 sends the set TPS1 thus formed to the undefined value sensitizing means 704. The means 704 sensitizes the undefined values in the set TPS1 to form the second test pattern set TPS2 and then, sends the set TPS2 to the test pattern removing/undefined values setting means 705.

At this time, it is supposed that the second test pattern set TPS2 sent from the undefined value sensitizing means 704 is a test pattern set 901 as shown in FIG. 3A. The set 901 contains n test patterns 1, 2, ..., and n that are arranged in this order. The test pattern removing/undefined values setting means 705 successively carried out fault simulation operations using the patterns 1, 2, ..., and n in the set 901.

FIG. 3A shows the number of detectable faults in the fault simulation operations using the set 901 and the number of undefined values before sensitization by the means 704. Here, it is supposed that the numbers of detectable faults in the simulation operations using the test patterns 1, 2, ..., and n are almost the same and that the numbers of undefined values before sensitization in the test patterns 1, 2, ..., and n are almost the same.

In the fault simulation operation using the first test pattern 1 in the set 901, a lot of faults are detected and removed from the target faults. Thus, in the fault simulation operation using the second test pattern 2, the number of the detected faults is smaller than that in the operation using the pattern 1. Similarly, in the fault simulation operation using the third test pattern 3, the number of the detected faults is smaller than that in the operation using the pattern 2. Thus, the number of the detected faults is minimized in the operation using the n-th pattern n.

Also, the test pattern removing/undefined values setting means 705 sets undefined values on the unnecessary input signals to fault detection according to the result of the fault simulation operations. As the number of the detected faults becomes larger, the number of the input signals on which the undefined values are set increases and at the same time, the number of the undefined values increases.

Accordingly, the third test pattern set TPS3 obtained by setting the undefined values is given by a test pattern set 902 shown in FIG. 3B. In the set 902, as seen from FIG. 3B, the number of the undefined values becomes larger and the number of the detectable faults becomes smaller according to the ascending order of the test patterns 1' to n'.

When the third test pattern set TPS3 (i.e., the test pattern set 902) is sent to the test pattern merging means 806, the means 706 merges the test patterns included in the set 902 as much as possible, forming the fourth test pattern set TPS4. The test pattern output means 707 sends the set TPS4 thus formed to the test pattern order reversing means 703 if further compression is needed. The means 703 reverses the order of the test patterns in the set TPS4 to form the first test pattern set TPS1 and then, it sends the set TPS1 thus formed to the undefined value sensitizing means 704. The means 704 sensitizes the undefined values in the set TPS1 to form the second test pattern set TPS2 and then, it sends the set TPS2 thus formed to the test pattern removing/undefined value setting means 705.

At this time, the second test pattern set TPS2 has the reversed order of the test patterns with respect to the test pattern set 902 of FIG. 3B, resulting in a test pattern set 903 including the test patterns n' to 1' arranged in this order, as shown in FIG. 3C. The test pattern removing/undefined value setting means 705 performs the fault simulation operations using the patterns n' to 1' in the set 903.

The number of the undefined values shown in FIG. 3C is a number before the undefined value sensitizing means 704 sensitizes the undefined values.

When the fault simulation operations are performed by the test pattern removing/undefined value setting means 705 using the test pattern set 903, the same result as that in the case using the test pattern set 901 of FIG. 3A is given.

Specifically, in the fault simulation operation using the first test pattern n', the number of the detectable faults is maximized. The number of the detectable faults decreases according to the descending order of the patterns (n−1) to 1. The more the faults are detected in the fault simulation operations, the more the input signals are set as undefined values and the higher the number of the undefined values becomes.

On the other hand, in the test pattern set 903, the umber of the undefined values increases and the number of the detectable faults decreases with the descending order of the patterns n' to 1'. Thus, the third test pattern set TPS3 given by setting the undefined values is given by a test pattern set 904 including the test patterns n" to 1" arranged in this order, as shown in FIG. 3D. As seen from FIG. 3D, in the set 904, the numbers of the detectable faults in the patterns n" to 1" are almost the same and the numbers of the undefined values in the test patterns n" to 1" are almost the same.

Paying attention to the numerical change of the detectable faults in the patterns n, n', and n", the numerical change has a tendency to vary like "medium→small→small→small→medium". The same tendency appears when the compression operation by the compression system 700 is further repeated. Thus, the test patterns with the number of the detectable faults being "0" are difficult to be generated and as a result, the unnecessary test patterns are difficult to be identified.

As explained above, with the prior-art test pattern set compression system 700 in FIG. 1, there is a problem that the test pattern compression performance varies dependent on the order of the test patterns contained in the initial test pattern set TPS0. Also, there is another problem that the unnecessary test patterns to fault detection in the set TPS0 are difficult to be identified. Thus, the compression performance is not satisfactorily high.

SUMMARY OF THE INVENTION

Accordingly, an object of the present invention is to provide a system, a method, and a computer program product for compressing a test pattern set for a logic circuit that eliminates the above-described problems in the prior-art test pattern set compression system.

Another object of the present invention is to provide a system, a method, and a computer program product for compressing a test pattern set for a logic circuit that compresses efficiently (i.e., at high compressibility) the test pattern set.

Still another object of the present invention is to provide a system, a method, and a computer program product for compressing a test pattern set for a logic circuit that compresses the test pattern set at high speed.

The above objects together with others not specifically mentioned will become clear to those skilled in the art from the following description.

According to a first aspect of the present invention, a system for compressing a test pattern set including test patterns arranged in a specific order to detect faults in a logic circuit is provided, which is comprised of:

(a) a test pattern rearranger subsystem that rearrange the test patterns included in the test pattern set to be in ascending order of a number of undefined values included in each of the patterns;

(b) an undefined value sensitizer subsystem that assigns a defined value to the respective undefined values included in each of the patterns, sensitizing the patterns;

(c) a test pattern remover subsystem that removes a fault-undetectable pattern or patterns from the patterns to which the defined value or values has/have been assigned by the undefined values sensitizer subsystem;

(d) an undefined value setter subsystem that sets undefined values to a parameter in each of the patterns unnecessary to fault detection; and (e) a test pattern merger subsystem that merges fault-detectable patterns included in the set that have not been removed by the test pattern remover subsystem according to a specific rule.

With the system for compressing a test pattern set according to the first aspect of the present invention, the test pattern set for the logic circuit can be compressed efficiently (i.e., at high compressibility) and/or at high speed due to the following reason.

Generally, as the number of undefined values included in a test pattern for a logic circuit decreases, the number of detectable faults in a testing operation using one of the test patterns in the set becomes larger. This fact was found by the inventor. Thus, the number of the faults that can be removed or excluded in a testing operation using one of the test patterns in the set increases with the decreasing number of undefined values in the pattern used for the testing operation. Taking this fact into consideration, with the system according to the first aspect of the invention, the test pattern rearranger subsystem is provided to rearrange the order of the test patterns included in the test pattern set so as to be in ascending order of the number of the undefined values included in each of the patterns.

Also, since the order of the test patterns included in the set is rearranged so as to be in ascending order of the number of the undefined values included in each of the patterns, the patterns with a larger number of the undefined values are used for later testing operations. Thus, these patterns tend to be easily merged with other pattern or patterns in the set by the test pattern merger subsystem.

Accordingly, the latter one of the patterns in the set is used for a testing operation, the less the number of the patterns in the set becomes, which means that the patterns in the set can be compressed efficiently or at high compressibility.

Moreover, a test pattern with less undefined values detects more faults than a test pattern with more undefined values. As a result, the latter the testing operation is performed, the shorter the time necessary to fault detection becomes, thereby decreasing the total time necessary to overall fault detection. Thus, the compression of the test pattern set can be carried out at high speed.

In a preferred embodiment of the system according to the first aspect of the invention, the rearranger subsystem rearranges the term patterns in the test pattern set using random numbers.

In another preferred embodiment of the system according to the first aspect of the invention, the rearranger subsystem rearranges the test patterns in the test pattern set using random numbers when no order change of the patterns in the set occurs according to rearrangement in ascending order of the number of undefined values, or an order change of the patterns in the set occurring according to rearrangement in ascending order of the number of undefined values is equal to or less than a specific threshold value. In this embodiment, there is an additional advantage to avoid the situation that no patterns is removed even if random numbers are used.

In still another preferred embodiment of the system according to the first aspect of the invention, the rearranger subsystem rearranges an additional rearrangement operation to the patterns merged by the test pattern merger subsystem after a rearrangement operation.

In a further preferred embodiment of the system according to the first aspect of the invention, there are further provided with a circuit/fault information input subsystem that inputs circuit information and fault information on the logic circuit; and a test pattern set generator subsystem that generates the test pattern set according to the circuit information and the fault information thus inputted. In this embodiment, the rearranger subsystem can rearrange any of the test pattern sets generated by the test pattern set generator subsystem.

According to a second aspect of the present invention, a method for compressing a test pattern set including test patterns arranged in a specific order to detect faults in a logic circuit is provided, which is comprised of:

(a) rearranging the order of the test patterns included in the test pattern to be in ascending order of a number of undefined values included in each of the patterns;

(b) assigning a defined value to the respective undefined values included in each of the patterns, sensitizing the undefined values;

the patterns with the sensitized undefined values containing a fault-undetectable pattern or patterns and a fault-detectable pattern or patterns for the logic circuit;

(c) removing the fault-undetectable pattern or patterns from the set;

(d) assigning an undefined values to a parameter unnecessary to fault detection in the fault-detectable pattern or patterns; and (e) merging some of the fault-detectable patterns that are mergeable together according to a specific rule.

With the method for compressing a test pattern set according to the second aspect of the invention, because of substantially the same reason as described in the system according to the first aspect of the invention, the test pattern sets for the logic circuit can be compressed efficiently (i.e., at high compressibility) and/or at high speed.

In a preferred embodiment of the method according to the second aspect of the invention, the step (a) of rearranging the order of the test patterns is performed by rearranging the test patterns in the set using random numbers.

According to a third aspect of the present invention, a computer program product having a computer readable medium and a computer program recorded thereon is provided, the computer program being operable to compress a test pattern set including test patterns arranged in a specific order to detect faults in a logic circuit, which is comprised of:

(a) code that rearranges the order of the test patterns included in the test pattern to be in ascending order of a number of undefined values included in each of the patterns;

(b) code that assigns a defined value to the respective undefined values included in each of the patterns, sensitizing the undefined values;

the patterns with the sensitized undefined values containing a fault-undetectable pattern or patterns and a fault-detectable pattern or patterns for the logic circuit;

(c) code that removes the fault-undetectable pattern or patterns from the set;

(d) code that assigns an undefined value to a parameter unnecessary to fault detection in the fault-detectable pattern or patterns; and (e) code that merges some of the fault-detectable patterns that are mergeable together according to a specific rule.

With the product according to the third aspect of the present invention, because of substantially the same reason as described in the system according to the first aspect of the invention, the test pattern sets for logic circuits can be compressed efficiently (i.e., at high compressibility) and/or at high speed.

In a preferred embodiment of the product according to the third aspect of the invention, the code (a) that rearranges the order of the test patterns is performed by rearranging the test patterns in the set using random numbers.

BRIEF DESCRIPTION OF THE DRAWINGS

In order that the present invention may be readily carried into effect, it will now be described with reference to the accompanying drawings.

FIG. 1 is a functional block diagram showing a prior-art test pattern set generator having a test pattern set compression system.

FIGS. 11A to 11D are schematic diagrams showing the type of the test patterns included in the test pattern set used in the test pattern set compression system according to the first embodiment of FIG. 5, respectively.

FIGS. 14A to 14C are schematic diagrams showing the operation of the test pattern merging means of the test pattern set compression system according to the first embodiment of FIG. 5, respectively.

FIGS. 15A to 15D are schematic diagrams showing the operation of the test pattern set compression system according to the first embodiment of FIG. 5, respectively.

FIGS. 16A and 16B are schematic diagrams showing the operation of the prior-art test pattern set compression system of FIG. 1, respectively.

DETAILED DESCRIPTION OF THE PREFERRED EMBODIMENTS

Figure 2A:
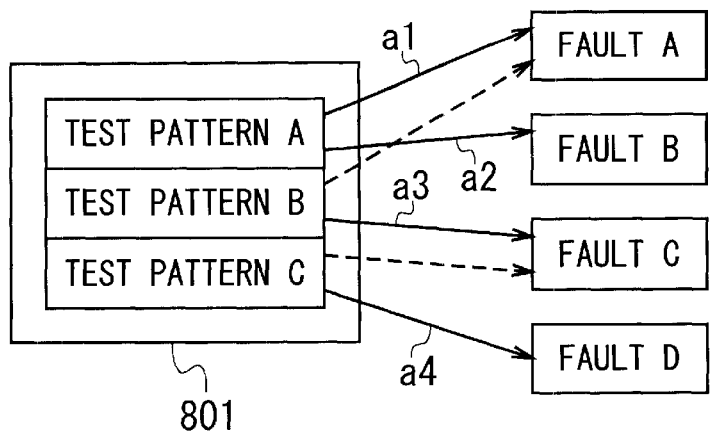
FIGS. 2A to 2C are schematic diagrams showing the relationship between the test patterns and detectable faults in the prior-art test pattern set compression system of FIG. 1, respectively.
Figure 2B:
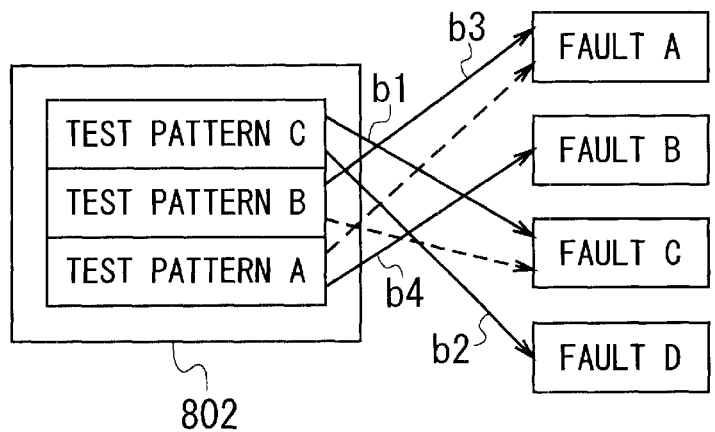
Figure 2C:
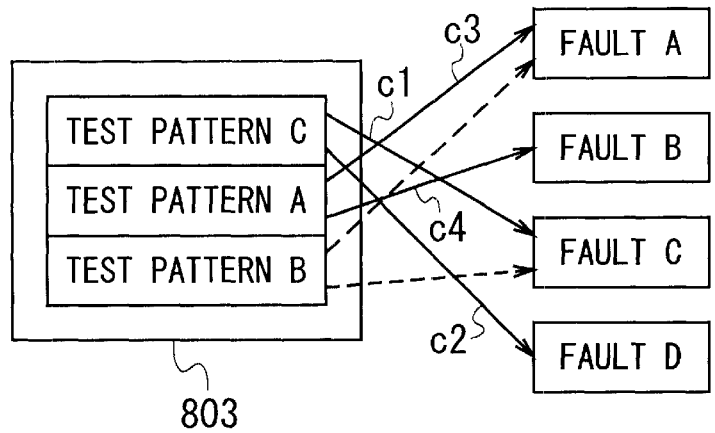
Figure 3A:
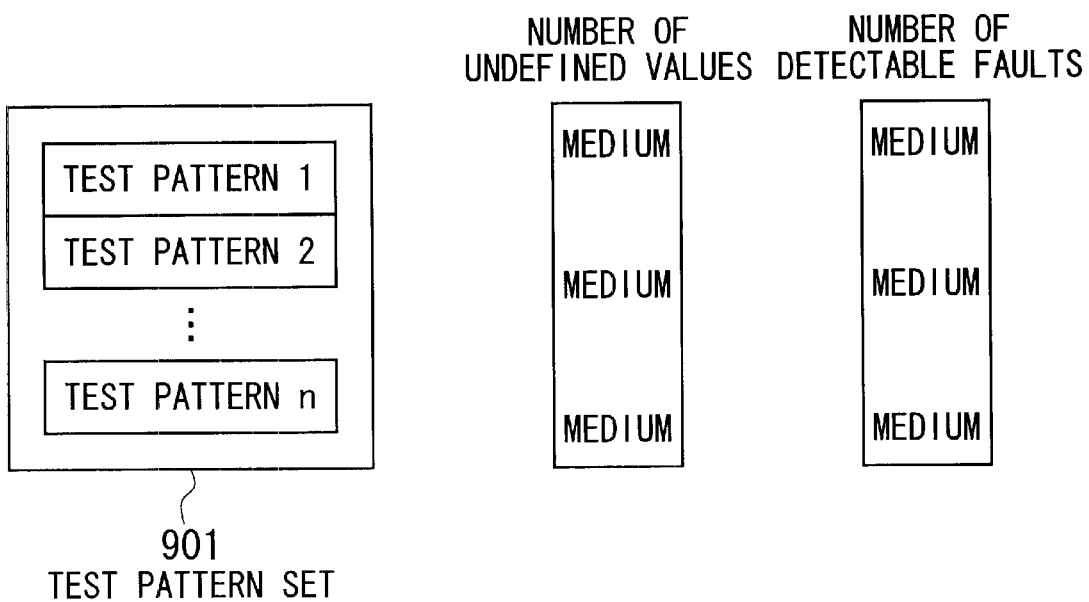
FIGS. 3A to 3D are schematic diagrams showing the change in the test pattern sets in the prior-art test pattern set compression system of FIG. 1, respectively.
Figure 3B:
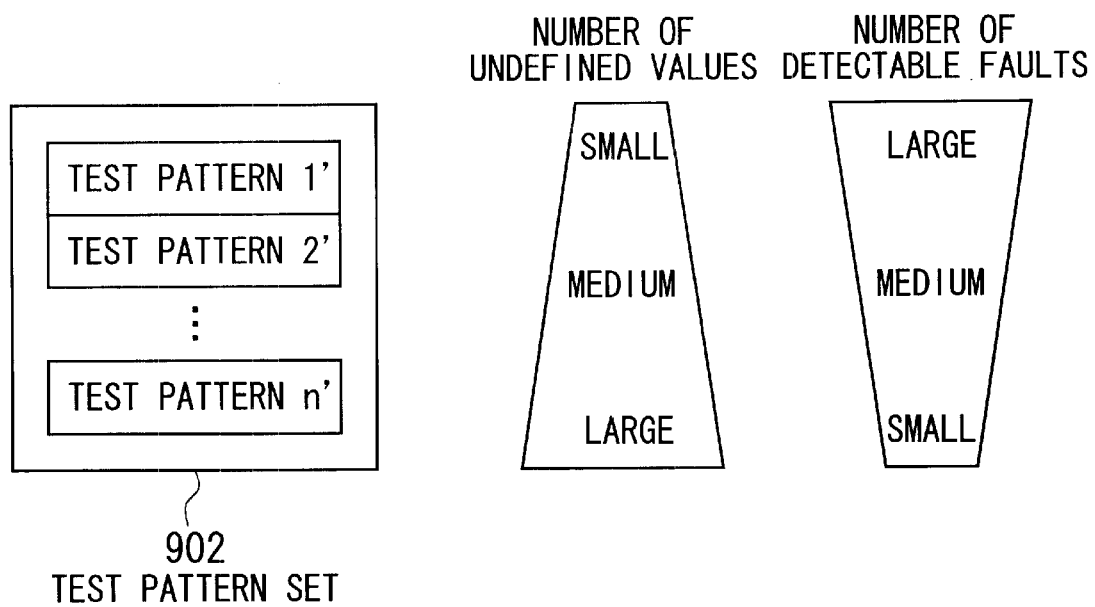
Figure 3C:
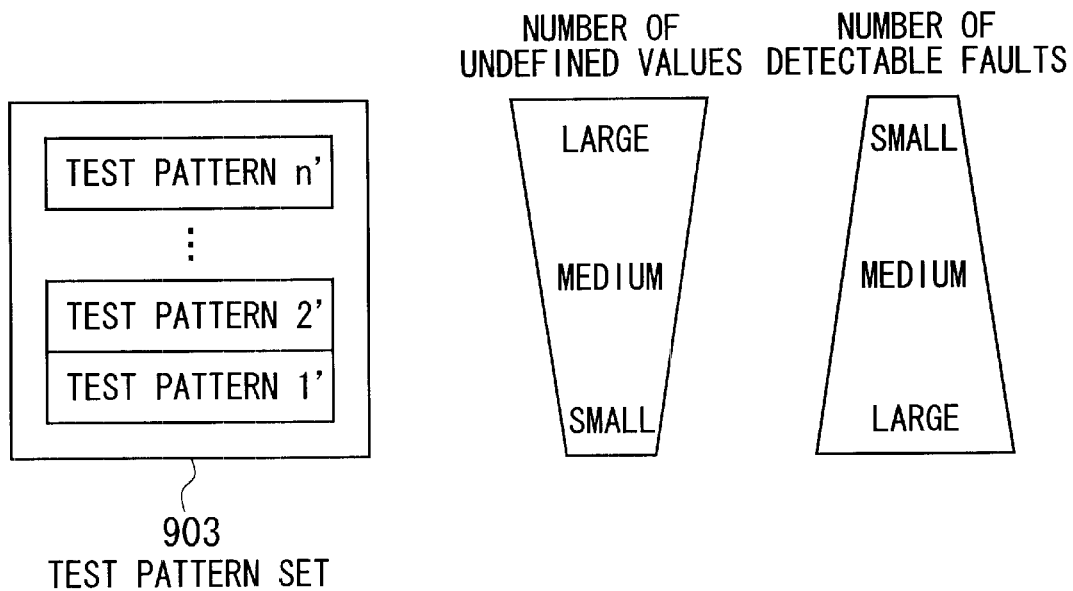
Figure 3D:
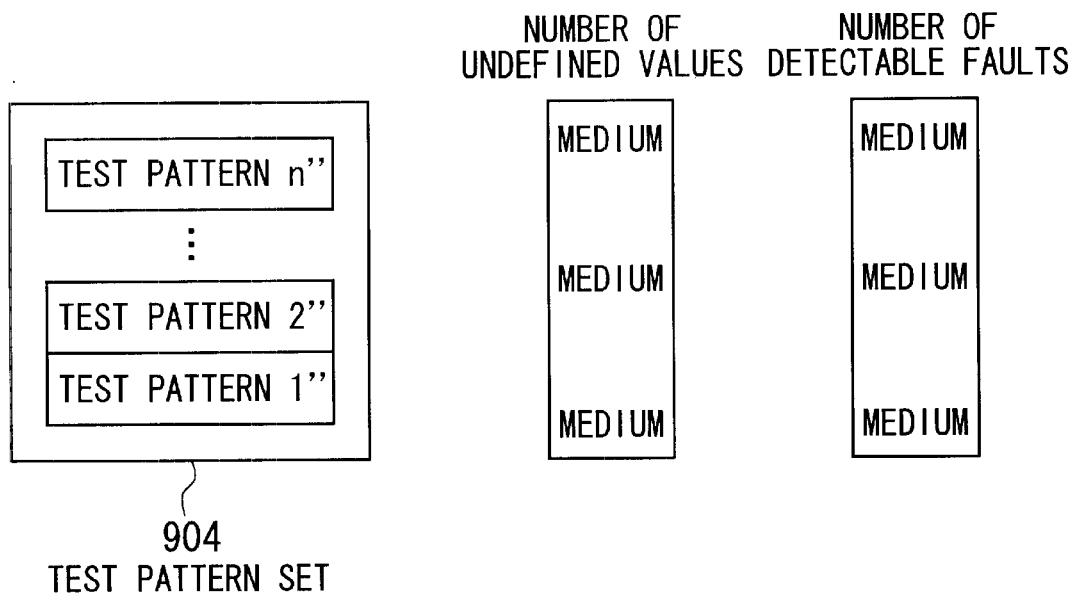

Preferred embodiments of the present invention will be described in detail below while referring to the drawings attached.

First Embodiment

Figure 4:
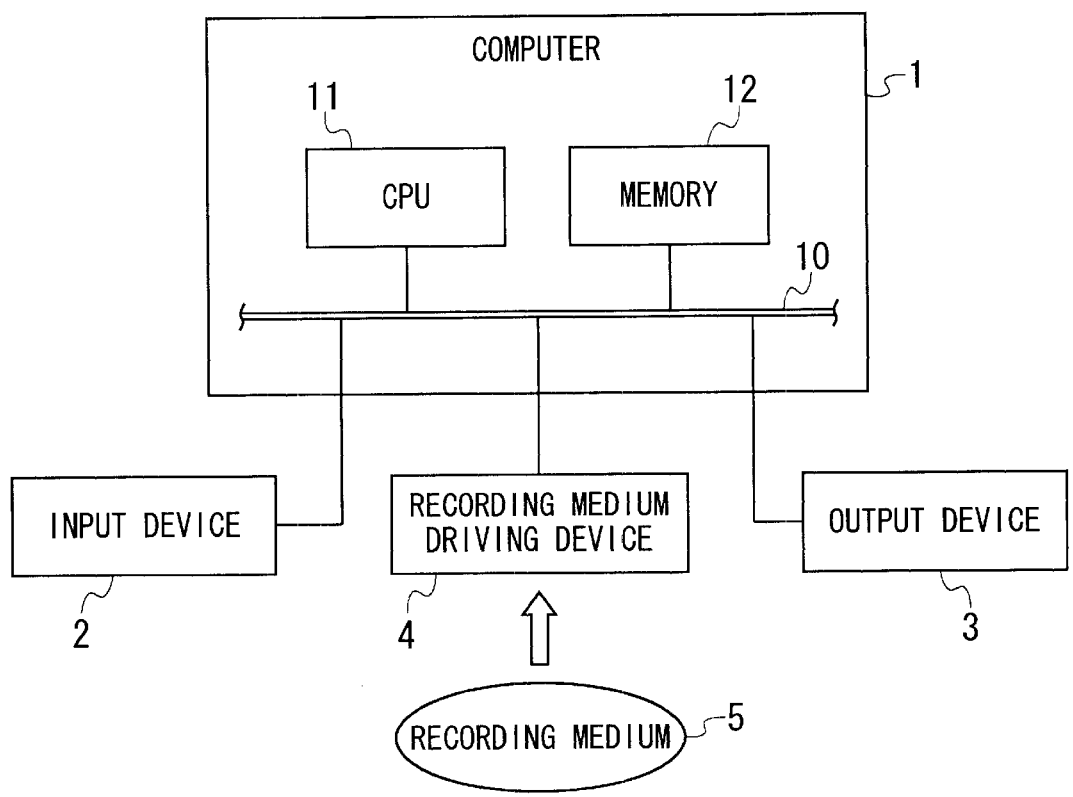
FIG. 4 is a functional block diagram showing the configuration of a computer system used for a test pattern set compression system according to a first embodiment of the present invention.

A test pattern set compression system according to a first embodiment of the invention is applied to a computer systems as shown in FIG. 4.

The computer system of FIG. 4 comprises a computer 1 having a Central Processing Unit (CPU) 11, a memory 12 and a bus 10, an input device 2, an output device 3, and a recording medium driving device 4. A recording medium 5 such as a removable disk (e.g., CD-ROM, CD-R, CD-RW, MO, FD) is detachably set in the driving device 4 for writing data in the medium 5 and/or reading data therefrom. A rigid or hard disk, which is not detachable, may be used as the medium 5.

The computer 1 is constituted by a general purpose computer, such as personal computers and workstations. The CPU 11 in the computer 1 executes the program on the memory 12 according to the input signals through the input device 2 and then, outputs the result of the executed program to the output device 3.

The input device 2 is used to input various instructions to control to the CPU 11 or to input various data (e.g., circuit information and/or fault information) to be processed in the CPU 11. The output device 3 is used to output the prosecution result of the CPU 11.

The recording medium driving device 4 reads out the program or data from the medium 5 according to the instructions from the CPU 11 and then, it transmits the program or data thus read out to the memory 12 by way of the bus 10. The CPU 11 executes the program on the memory 12, thereby implementing a test pattern set compression operation according to the first embodiment of the invention.

(Configuration of Test Pattern Set Generator)

Figure 5:
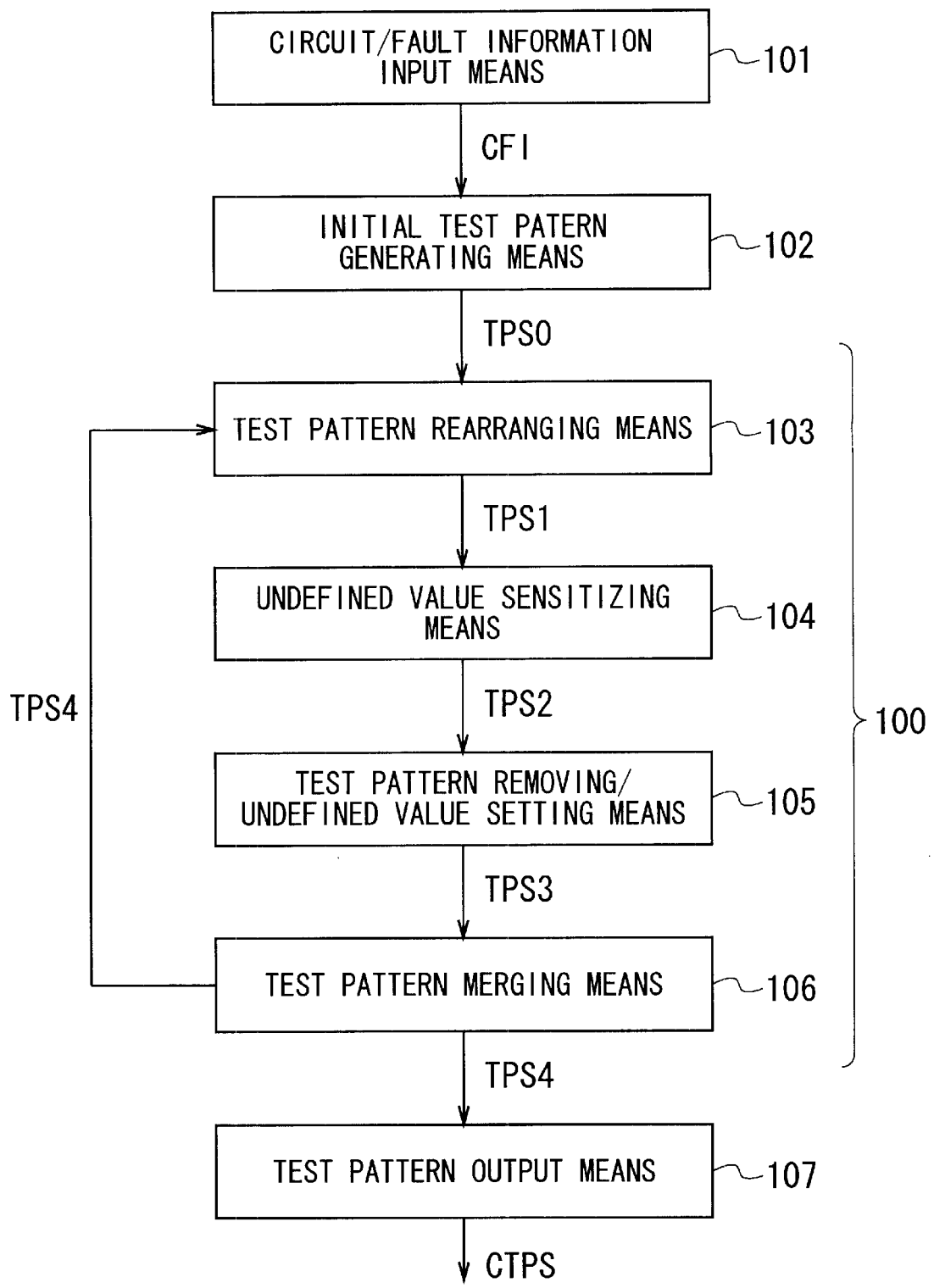
FIG. 5 is a functional block diagram showing the configuration of a test pattern set generator equipped with the test pattern set compression system according to the first embodiment of the invention.

FIG. 5 shows the configuration of a test pattern set generator equipped with the test pattern set compression system according to the first embodiment. The generator is realized on or by the computer system shown in FIG. 4.

The test pattern set generator of FIG. 5 comprises circuit/fault information input means 101, initial test pattern generating means 102, the test pattern set compression system 100 according to the first embodiment, and test pattern output means 107. The test pattern set compression system 100 includes test pattern rearranging means 103, undefined value sensitizing means 104, test pattern removing/undefined value setting means 105, and test pattern merging means 106.

The circuit/fault information input means 101 fetches the information about the configuration of a logic circuit to be tested (e.g., information about electronic elements and interconnection between these elements) and the information about faults defined for the logic circuit to be tested from outside through the input device 2. Then, the means 101 sends the information to the initial test pattern generating means 102. The information about the configuration of the logic circuit to be tested and the information about the faults thereof is termed the "circuit/fault information CFI" below.

The initial test pattern generating means 102 generates an initial test pattern set TPS0 (i.e., a test pattern set to be compressed in the initial state) on the basis of the circuit/fault information CFI sent by the initial test pattern generating means 102. The generation of the initial set TPS0 is realized by any of known arts. Then, the means 102 sends the initial set TPS0 thus generated to the test pattern rearranging means 103.

The test pattern rearranging means 103 rearranges the initial order of the test patterns included in the initial test pattern set TPS0 or a fourth test pattern sets TPS4 sent from the test pattern merging means 106 explained later. Thus, due to the rearrangement operation of the test patterns, the initial test pattern set TPS0 or the fourth test pattern set TPS4 is converted to a first test pattern set TPS1. Then, the means 103 sends the first test pattern set TPS1 thus obtained to the undefined value sensitizing means 104.

Figure 6:
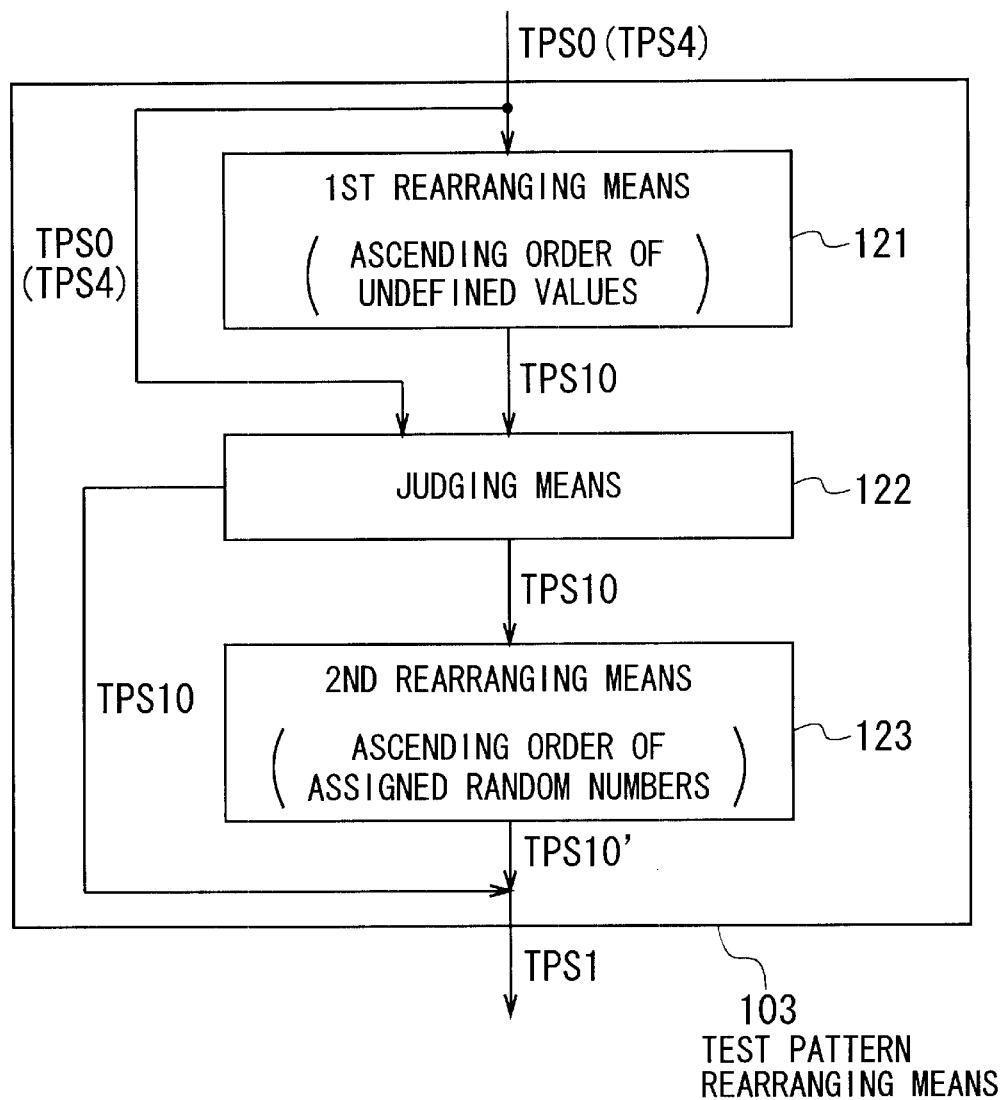
FIG. 6 is a functional block diagram showing the configuration of a test pattern rearranging means of the test pattern set compression system according to the first embodiment of FIG. 5.

Here, the test pattern rearranging means 103 is explained in more detail with reference to FIG. 6. FIG. 6 shows the detailed configuration of the test pattern rearranging means 103.

As shown in FIG. 6, the test pattern rearranging means 103 comprises a first rearranging means 121, a judging means 122, and a second rearranging means 123.

The first rearranging means 121 rearranges the test patterns included in the initial or fourth test pattern set TPS0 or TSP4 to be in ascending order of the number of the undefined values (i.e., the number of the undefined values increases from the first one of the patterns to the last one), resulting in a test pattern set TPS10. In other words, the initial or fourth test pattern set TPS0 or TSP4 is converted to the test pattern set TPS10 by the rearrangement operation. The set TSP10 thus generated is sent to the judging means 122.

The judging means 122 compares the set TSP10 with the initial or fourth set TPS0 or TPS4 and judges whether the order of the test patterns in the set TSP10 has been changed or not with respect to the set TPS0 or TPS4. When the order has been changed, the means 122 sends the set TPS10 to the undefined value sensitizing means 104 as the first test pattern set TPS1 without using the second rearranging means 123. When the order has not been changed, the means 122 sends the set TPS10 to the second rearranging means 123.

The second rearranging means 123 assigns pseudo random numbers to the respective test patterns included in the set TPS10 thus sent, thereby rearranging these test patterns according to the pseudo random numbers thus assigned. For example, these test patterns are rearranged to be in ascending order of the pseudo random numbers. Thus, the set TPS10 is converted to a test pattern set TPS10'. The means 123 sends the set TPS10' thus obtained to the undefined value sensitizing means 104 a the first test pattern set TPS1.

As explained above, the test pattern rearranging means 103 changes the order of the test patterns in the set TPS0 or TPS4 to be in ascending order of the number of the undefined values, forming the set TPS10. If the number of the undefined values in the set TPS10 is equal to that in the set TPS0 or TPS4 and therefore, the order of the patterns is not changed, the order of the test patterns in the set TPS10 is changed by assigning pseudo random numbers to the patterns in the set TPS10, forming the TPS10'. As a result, the first test pattern set TPS1 always has an order change of the patterns.

Returning to FIG. 5, the undefined value sensitizing means 104 assigns the logic state (i.e., the signal value) of "0" or "1" to the input signals included in the individual test patterns of the first test pattern set TPS1 on which undefined values have been set. Thus, the undefined values of each pattern of the set TPS1 are sensitized. Due to the sensitization of the undefined values, the set TSP1 is converted to a second test pattern set TPS2. The means 104 sends the set TPS2 thus obtained to the test pattern removing/undefined value setting means 105.

The sensitization by the undefined value sensitizing means 104 is performed to facilitate the fault detection of the logic circuit to be tested. When a test pattern with undefined values is inputted into a logic circuit, in general, undefined logic states (i.e., the logic state may be any one of "0" or "1") tend to be present in the logic circuit. Existence of the undefined values eliminates the change appearing in the output signal even if some fault is present to cause some signal change, which means that the fault is unable to be detected by the test pattern. Then, the undefined values in the test patterns are sensitized by the means 104, thereby making the undefined logic states difficult to occur to facilitate the fault detection.

The test pattern removing/undefined value setting means 105 extracts successively the test patterns in the second test pattern set TPS2 and then, fault simulation operations are successively carried out using the individual test patterns thus extracted. According to the result of the fault simulation operations, the means 105 identifies unnecessary test patterns to fault detection from the test patterns in set TPS2 and then, it removes the unnecessary test patterns thus identified from the set TPS2. Also, according to the result of the fault simulation operations, the means 105 identifies unnecessary input signals to fault detection from the input signals included in each of the test patterns that have detected some fault or faults. Then, the means 105 changes the values of the unnecessary input signals thus identified to undefined values, in other words, undefined values are set on the unnecessary input signals thus identified. This is performed to raise the possibility of merging the test patterns.

Thus, the unnecessary test patterns to fault detection are removed from the second test pattern set TPS2 and at the same time, the values of the unnecessary input signals included in each of the patterns that have not been removed are replaced by undefined values, thereby converting the set TPS2 to a third test pattern set TPS3. The means 105 sends the set TPS3 to the test pattern merging means 106.

The test pattern merging means 106 identifies two or more mergeable test patterns from the test patterns included in the third test pattern set TPS3 according to a specific rule. When some mergeable test patterns are identified, the patterns thus identified are merged together, thereby forming a fourth test pattern set TPS4 from the set TPS3. The set TPS4 corresponds to a compressed one of the initial test pattern set TPS0.

Moreover, the test pattern merging means 106 makes a judgment whether or not the fourth test pattern set TPS4 needs to be further compressed. When further compression is judged necessary, the means 106 returns the set TPS4 to the test pattern rearranging means 103 and then, the means 103, 104, 105, and 106 compresses the set TPS4 again in the same way as performed for the initial test pattern set TPS0. When further compression is judged unnecessary, the means 106 sends the set TPS4 to the test pattern output means 107.

The test pattern output means 107 outputs the fourth test pattern set TPS4 to the outside of the test pattern set generator of FIG. 5 as a finally-compressed test pattern set CTPS.

(Operation of Test Pattern Set Generator)

Next, the operation of the test pattern set generator of FIG. 5 is explained below with reference to FIG. 7.

When the circuit/fault information CFI to be used for the test pattern set generation is inputted into the circuit/fault information input means 101 through the input device 2, the means 101 sends the information CFI thus inputted to the initial test pattern generating means 102 (step S1).

The initial test pattern generating means 102 generates the initial test pattern set TPS0 by a known method according to the information CFI thus received (step S2). The initial set TPS0 thus generated is sent to the test pattern rearranging means 103.

Figure 8:
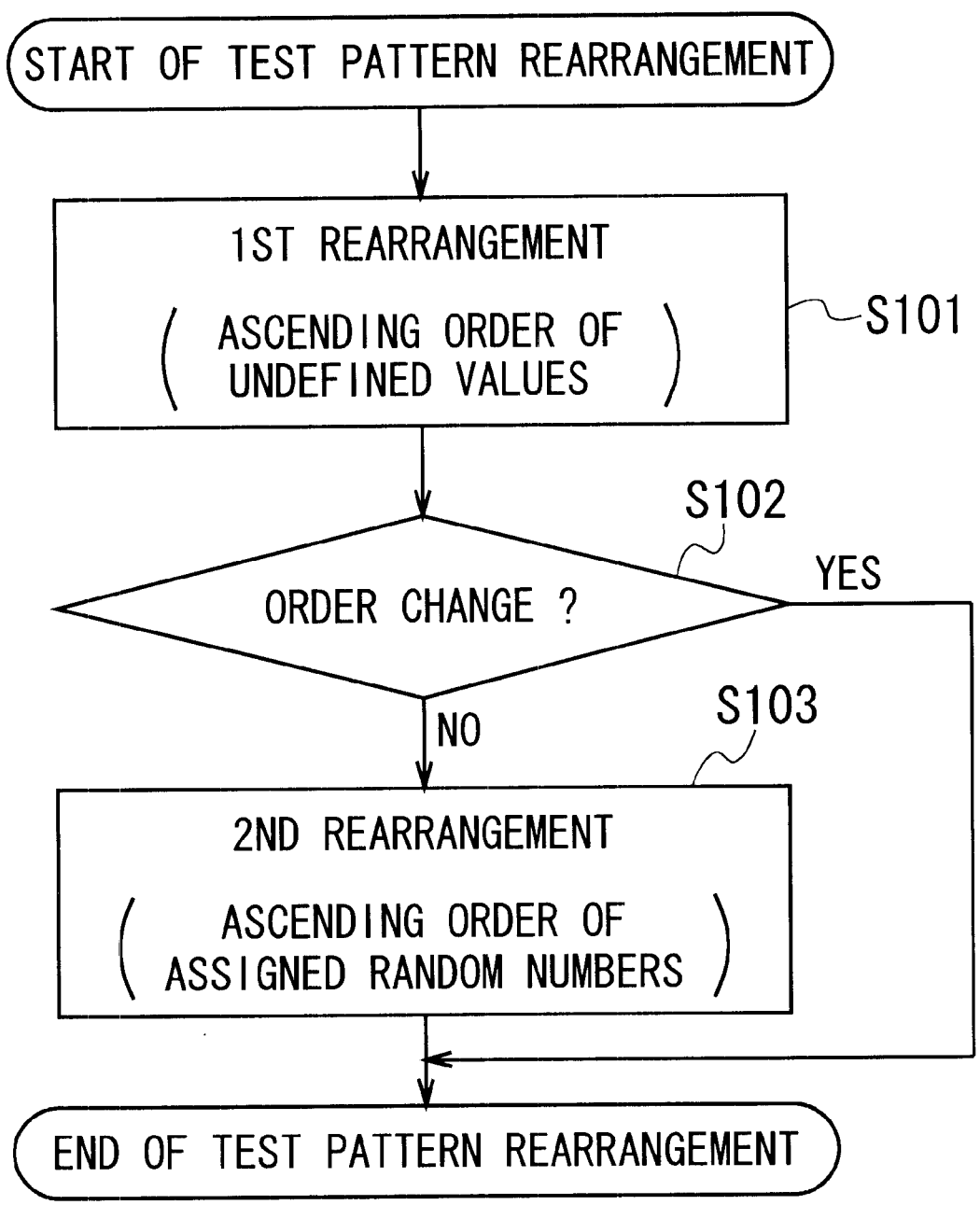
FIG. 8 is a flowchart showing the process steps of test pattern rearrangement using the test pattern set compression system according to the first embodiment of FIG. 5.

The test pattern rearranging means 103 rearranges the order of the test patterns included in the initial set TPS0 (step S3) according to the process steps shown in FIG. 8.

In the step S101 in FIG. 8, the first rearranging means 121 of the test pattern rearranging means 103 rearranges the test patterns included in the initial set TPS0 to be in ascending order of the number of the undefined values. Due to the rearrangement in the step S101, the initial set TPS0 is converted to the test pattern set TPS10.

In the step S102, the judging means 122 of the test pattern rearranging means 103 judges whether or not the order of the test patterns in the set TPS10 has been changed by the rearrangement operation in the step S101. When the result of the judgment is "yes", i.e., some order change of the test patterns has occurred, the rearrangement operation is finished. When the result of the judgment is "no", i.e., no order change of the test patterns has occurred, the step S103 is then carried out.

In the step S103, the second rearranging means 123 of the test pattern rearranging means 103 assigns pseudo random numbers to the respective test patterns in the set TPS10 and then, the means 123 arranges the test patterns to be in ascending order of the random numbers thus assigned. Due to the process in the step S103, the test pattern set TPS10 is converted to the test pattern set TPS10'. Then, the rearrangement operation is completed.

As explained above, through the steps S101 to S103 in FIG. 8, the test patterns in the initial set TPS0 are rearranged, thereby converting the set TPS0 to the set TPS10 or TPS10'. The set TPS10 or TPS10' thus obtained is sent from the test pattern rearranging means 103 to the undefined value sensitizing means 104 as the first test pattern set PTS1.

Returning to FIG. 7, the undefined value sensitizing means 104 searches the input signals on which the undefined values have been set from the test patterns in the first test pattern set TPS1. Also, the means 104 assigns any one of the logic states of "0" and "1" to the individual input signals to which the undefined values have been set, thereby sensitizing the undefined values (step S4 in FIG. 7). Due to the operation in the step S4, the first set TPS1 is converted to the second set TPS2. The set TPS2 is then sent to the test pattern removing/undefined values setting means 105.

Figure 7:
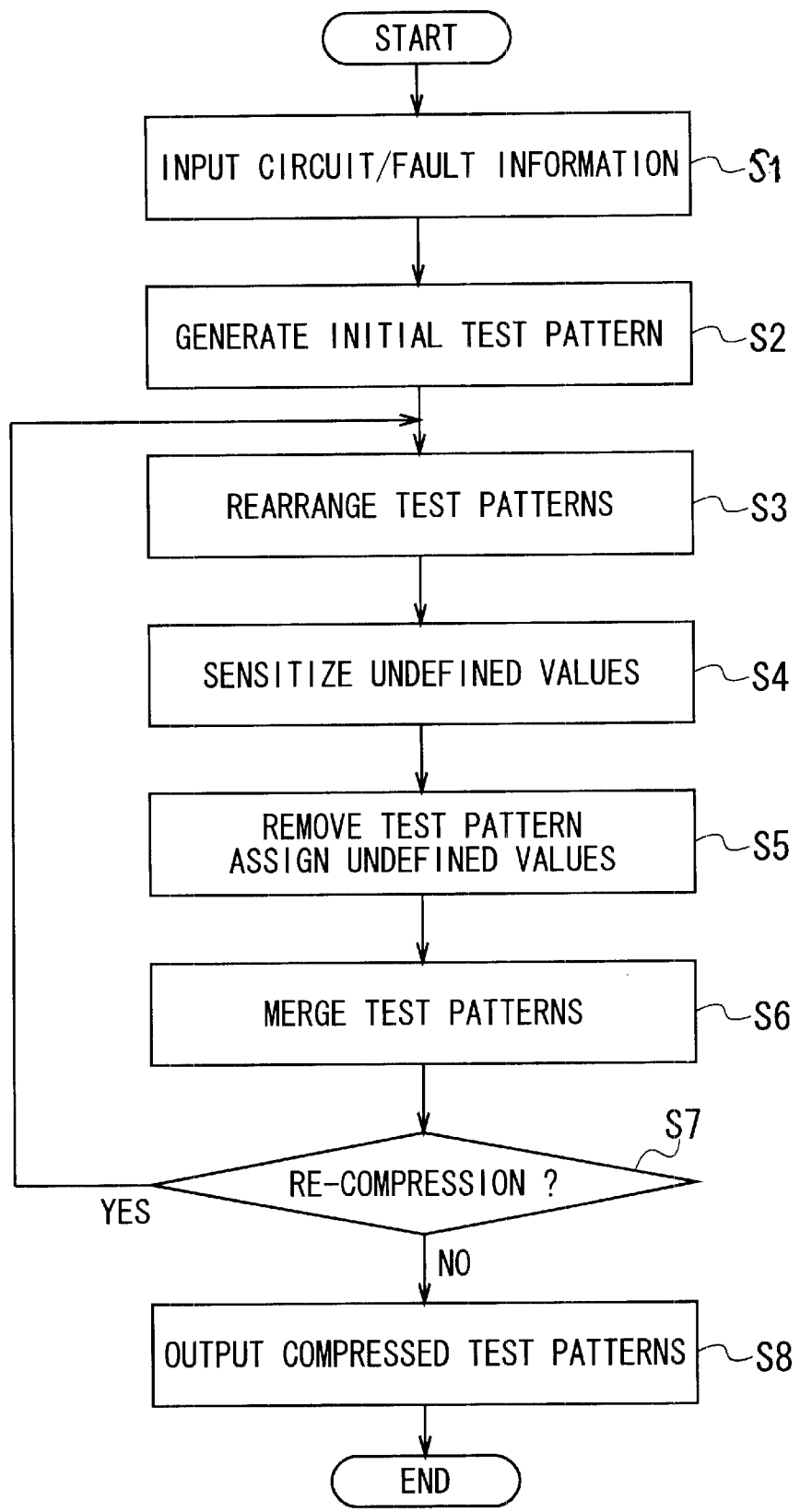
FIG. 7 is a flowchart showing the process steps of generating the test pattern set using the test pattern set generation system according to the first embodiment of FIG. 5.

The test pattern removing/undefined value setting means 105 removes the unnecessary test patterns from the set TPS2 and then, the means 105 sets undefined values on the respective unnecessary input signals therein (step S5 in FIG. 7). The operation in the step S5 is carried out according to the flowchart shown in FIG. 9.

Figure 9:
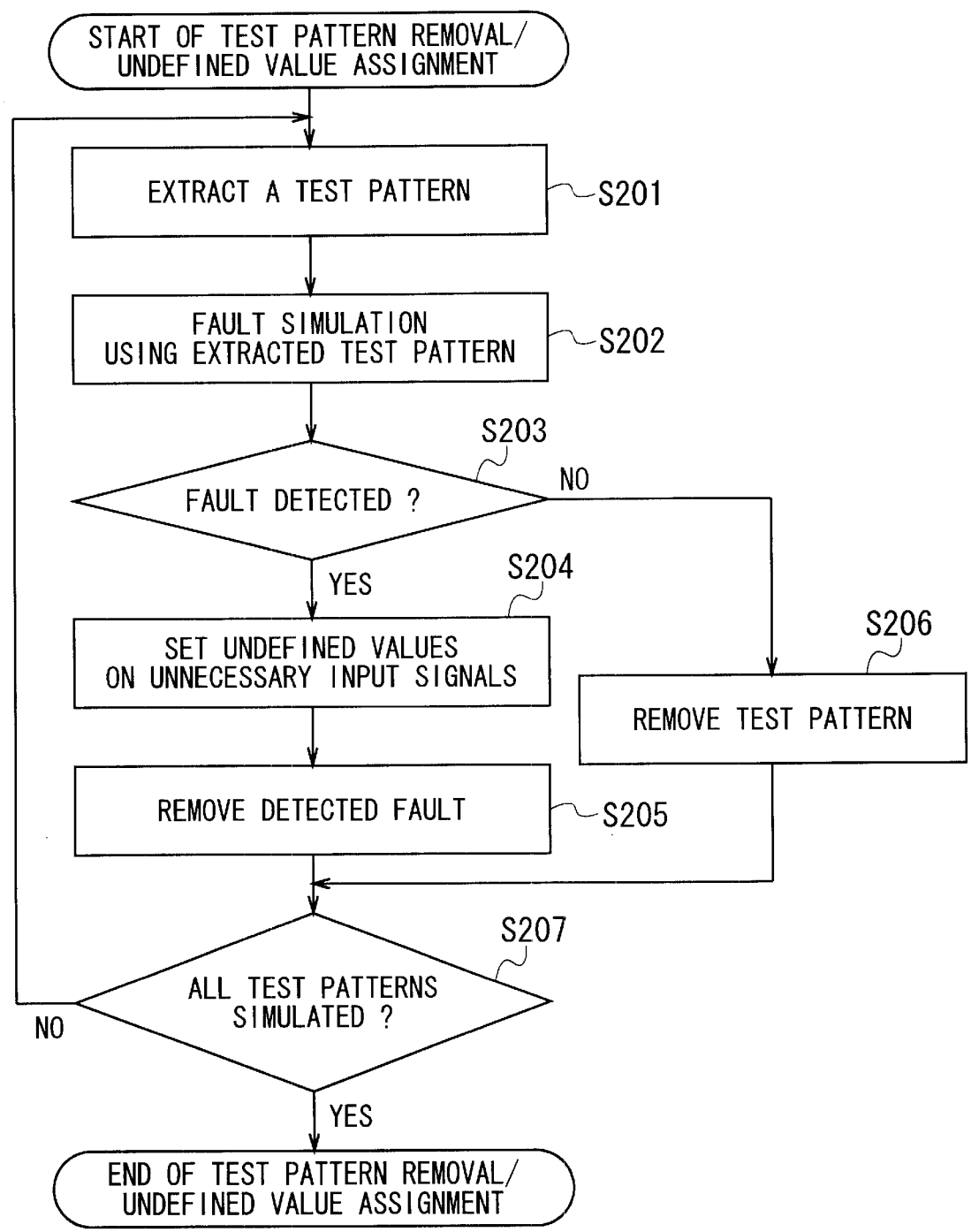
FIG. 9 is a flowchart showing the process steps of test pattern removal/undefined value assignment using the test pattern set compression system according to the first embodiment of FIG. 5.

As shown in FIG. 9, the test pattern removing/undefined value setting means 105 extracts one of the test patterns from the second test pattern set TPS2 (step S201). Next, the means 105 performs a fault simulation operation of the logic circuit to be tested using the test pattern thus extracted (step S202). According to the result of the simulation operation, the means 105 judges whether some fault or faults has/have been detected or not (step S204).

If some fault or faults has/have been detected, i.e., the result of the judgment in the step S203 is "yes", the test pattern removing/undefined value setting means 105 sets undefined values on all the input signals unnecessary to detecting the fault or faults thus detected with respect to the test pattern used in the simulation operation in the step S202 (step S204). Then, the means 105 excludes the fault or faults thus detected from the target faults (step S205). Thereafter, the flow is progressed to the step S207.

On the other hand, if no fault has been detected, i.e., the result of the judgment in the step S203 is "no", the test pattern removing/undefined value setting means 105 excludes or removes the test pattern that has been used in the fault simulation operation in the step S202 from the second test pattern set TPS2 (step 206). Thereafter, the flow is progressed to the step S207.

In the step S207, the test pattern removing/undefined value setting means 105 judges whether or not the fault simulation has been completed with respect to all the test patterns included in the second set TPS2. If the fault simulation needs to be performed for some of the test patterns in the set TPS2, i.e., the result of the judgment in the step S207 is "no", the flow is returned to the step S201 and then, the steps S201 to S207 are repeated. If the fault simulation has been completed for all the test patterns in the set TPS2, i.e., the result of the judgment in the step S207 is "yes", the flow is finished.

Through the operations in the steps S201 to S207 of FIG. 9, the test patterns unnecessary to fault detection are removed or excluded and at the same time, undefined values are set or assigned to the input signals unnecessary to fault detection. Thus, the second test pattern set TPS2 is converted to the third test pattern set TPS3. The set TPS3 thus formed is sent to the test pattern merging means 106 by the means 105.

Returning to FIG. 7, the test pattern merging means 106 merges the test patterns included in the third test pattern set TPS3 thus received (step S6). The merging operation of the means 106 is carried out according to the flowchart shown in FIG. 10.

Figure 10:
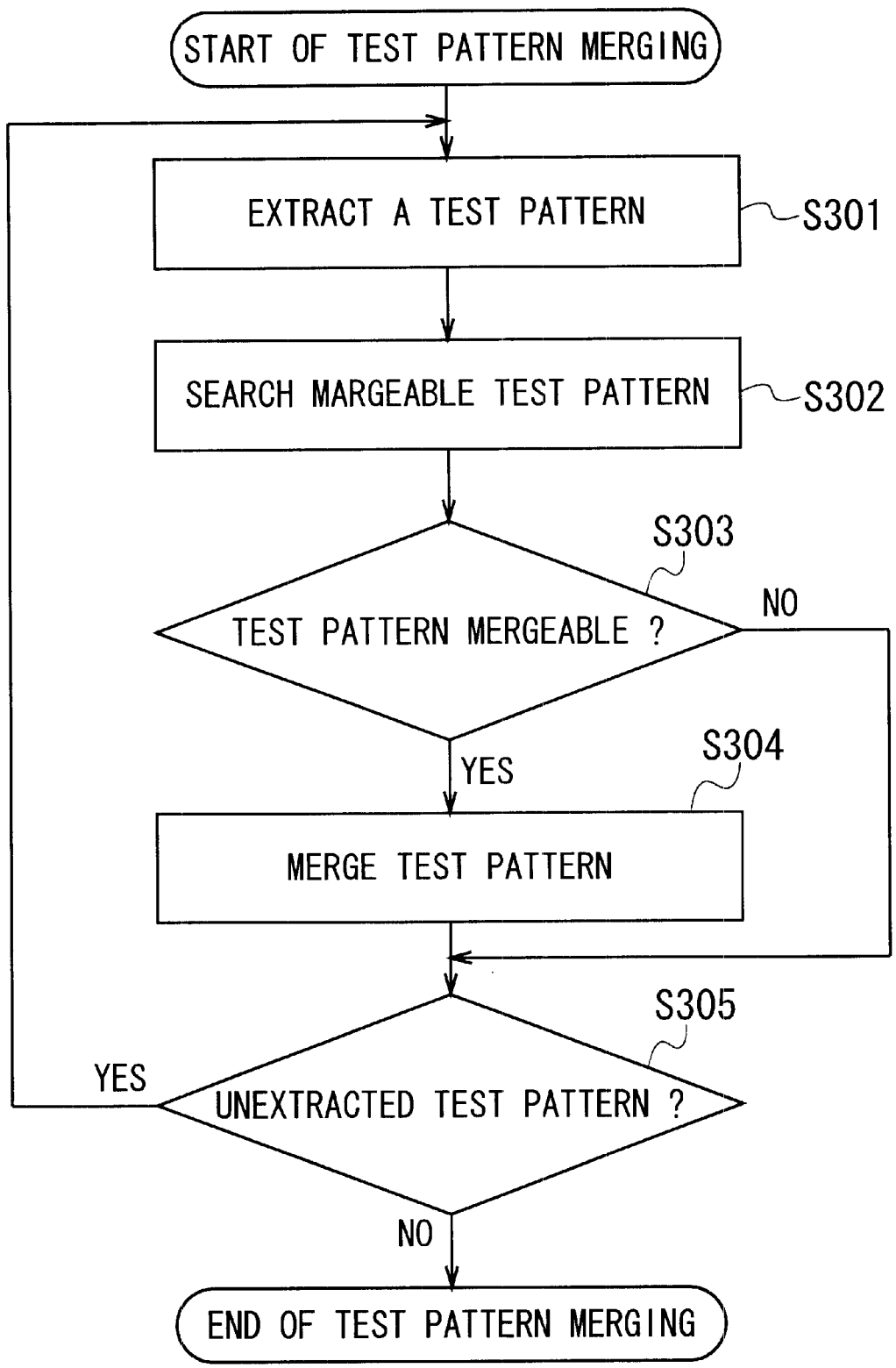
FIG. 10 is a flowchart showing the process steps of test pattern merging using the test pattern set compression system according to the first embodiment of FIG. 5.

First, the test pattern merging means 106 extracts one of the test patterns in the third test pattern set TPS3 (step S301 in FIG. 10). Next, the means 106 examines whether or not the test pattern thus extracted can be merged with the unextracted test pattern or patterns in the set TPS3 according to a specific rule. In other words, the means 106 searches mergeable test patterns that can be merged with the extracted pattern (step S302 in FIG. 10). Then, the means 106 judges whether or not mergeable patterns have been found (step S303 in FIG. 10).

If no mergeable patterns have been found, i.e., the result of the judgment in the step S303 is "no", the flow is jumped to the step S305. On the other hand, if some mergeable patterns have been found, i.e., the result of the judgment in the step S303 is "yes", the means 106 merges the extracted pattern with the mergeable patterns thus found (step S305 in FIG. 10). Then, the flow is progressed to the step S305.

In the step S306, the test pattern merging means 106 judges whether or not any unextracted pattern or patterns is/are left in the third test pattern set TPS3. If some patterns are left unextracted, i.e., the result of the judgment in the step S305 is "yes", the flow is returned to the step S301 and then, the operations in the steps S301 to S305 are carried out. On the other hand, if no patterns are left unextracted, i.e., the result of the judgment in the step S305 is "no", the flow is finished.

Through the processes in the steps S301 to S305 in FIG. 10, the test patterns included in the third test pattern set TPS3 are merged as much as possible. Due to the merging operation, the set TPS3 is converted to the fourth test pattern set TPS4. Thus, a first compression operation is completed for the initial test pattern set TPS0.

Moreover, the test pattern merging means 106 examines whether or not the initial test pattern set TPS0 has been sufficiently compressed. Then, the means 106 judges whether or not the compressed set TPS0 needs further compression or not (step S7 in FIG. 7). If further compression is needed, i.e., the result of the judgment in the step S7 is "yes", the means 106 sends the fourth test pattern set TPS4 to the test pattern rearranging means 103 and then, it returns the flow to the step S1. Thereafter, the operations in the steps S3 to S7 are carried out again for the set TPS4. Thus, by repeating the steps S3 to S7 as necessary, the initial test pattern set TPS0 can be compressed as much as possible.

On the other hand, if further compression is not needed, i.e., the result of the judgment in the step S7 is "no", the means 106 sends the fourth test pattern set TPS4 to the test pattern output means 107. Then, the means 107 outputs the set TPS4 as the finally-compressed test pattern set CTPS to the outside (step S8).

(Concrete Operations of Test Pattern Compression System)

The operations of the test pattern rearranging means 103, the undefined value sensitizing means 104, the undefined value assigning means 105, and the test pattern merging means 106 of the test pattern compression system 100 are explained in more detail using a concrete example with reference to FIGS. 11A to 11D and FIGS. 12A to 12D. The effects of these operations that will be applied to the other means are explained additionally.

(Test Pattern Rearranging Means)

First of all, the rearrangement operation of the test pattern rearranging means 103 is explained below.

As described previously, the test pattern rearranging means 103 rearranges the order of the test patterns included in the initial or fourth test pattern set TPS0 or TPS4 to be in ascending order of the number of the undefined values. It is supposed that the patterns to be rearranged are sorted into first, second, third, and fourth types or kinds 201, 202, 203, and 204 shown in FIGS. 11A to 11D. For the sake of simplification, the test patterns of the first, second, the third, and fourth types 201, 202, 203, and 204 are respectively termed the patterns 201, 202, 203, and 204 later.

Here, it is supposed that each of the patterns 201, 202, 203, and 204 has 16 inputs signals IS1 to IS16. The hatched regions in FIGS. 11A to 11D denote the input signals necessary to corresponding fault detection.

Figure 11A:

With the test pattern 201 in FIG. 11A, a fault F1 is detected by the input signals IS2 to IS4 and IS6 to IS8 and a fault F2 is detected by the input signals IS4 and IS5. A fault F3 is detected by the input signals IS5 and IS6 and a fault F4 is detected by the input signals IS10 to IS12. A fault F5 is detected by the input signal IS1. As a result, to detect all the five faults F1 to F5, 14 input signals IS1 to IS12, IS15, and IS16 are necessary. Thus, with the pattern 201, not only the number of the target faults but also the total number of the necessary input signals to fault detection (i.e., the input signals without undefined values) are large.

Figure 11B:

With the test pattern 202 in FIG. 11B, a fault F6 is detected by the input signal IS12 and a fault F7 is detected by the input signal IS11. A fault F8 is detected by the input signals IS10 to IS12 and a fault F9 is detected by the input signal IS12. A fault F10 is detected by the input signals IS11 and IS12. As a result, to detect all the five faults F6 to F10, three input signals IS10 to IS12 are necessary. Thus, with the pattern 202, the number of the target faults is large while the total number of the necessary input signals are small.

With the test pattern 203 in FIG. 11C, a fault F11 is detected by the input signals IS12 and IS13 and a fault F12 is detected by the input signals IS1 to IS12, IS15, and IS16. As a result, to detect all the two faults F11 and F12, 15 input signals IS1 to IS13, IS15, and IS16 are necessary. Thus, with the pattern 203, the number of the target faults is small while the total number of the necessary input signals are large.

With the test pattern 204 in FIG. 11D, a fault F13 is detected by the input signals IS12 and IS13 and a fault F14 is detected by the input signals IS13 and IS14. As a results, to detect all the two faults F13 and F14, three input signals IS12 to IS14 are necessary. Thus, with the pattern 204, not only the number of the target faults but also the total number of the necessary input signals are small.

As described previously, with the test pattern set compression system 100 according to the first embodiment of FIG. 5, the steps S3 to S7 in FIG. 7 are performed repeatedly. In the second or later practices of the step S3, the test patterns in the fourth test pattern set TP54 are rearranged. The set TPS4 is generated by setting undefined values to the unnecessary input signals by the test pattern removing/ undefined value setting means 105 in the step S5. If the number of the undefined values in the test pattern in the set TPS4 is small, the number of the necessary input signals for the test pattern to detect the fault or faults is large, which is applied to the pattern 201 or 203. Contrarily, if the number of the undefined values in the test pattern in the set TPS4 is large, the number of the necessary input signals for the test pattern to detect the fault or faults is small, which is applied to the pattern 202 or 204.

In the step S5 of FIG. 7, the test pattern removing/ undefined value setting means 105 extracts successively the test patterns in the fourth set TPS4 and then, if some fault or faults is/are detected by the pattern or patterns thus extracted, the means 105 excludes the detected fault or faults from the target faults. Thus, the later the test patterns in the set TPS4 are extracted by the means 105, the higher the possibility that the number of the target faults decreases rises. Reviewing the test patterns 201, 202, 203, and 204 in FIGS. 11A to 11D, it seems to us that the patterns 203 and 204 having a relatively small number of the target faults are higher in possibility that the number of the target faults decreases finally to zero than the patterns 201 and 202 having a relatively large number of the target faults. However, to reduce the number of the target faults, the number of the undefined values in the test pattern is more important than the number of the target faults. The reason of this fact is explained below while reviewing the test patterns 202 and 203.

Specifically, the test pattern 202 in FIG. 11B has a small number of the necessary input signals to detect the faults F6 to F10. Thus, if the undefined value sensitizing means 104 assigns a defined value of "0" to "1" to the respective undefined values of the other test patterns than the test pattern 202, there is a high possibility that the faults F6 to F10 can be detected by using the other test patterns than the test pattern 202. As a result, there is a high possibility that the number of the target faults is decreased to zero by setting the test pattern 202 to be extracted finally.

On the other hand, the test pattern 203 in FIG. 11C has a large number of the necessary input signals to detect the fault F12. Thus, even if the undefined value sensitizing means 104 assigns a defined value of "0" or "1" to the respective undefined values of the other test patterns than the test pattern 203, the possibility that the fault F11 can be detected by using the other test patterns than the test pattern 203 is low. As a result, there is a lower possibility that the number of the target faults is decreased to zero than the test pattern 202 even if the test pattern 203 is set to be extracted finally.

As seen from the above comparison between the patterns 202 and 203, when the patterns 201 and 203 having a small number of the undefined values are extracted earlier than the patterns 202 and 204, there is a higher possibility that the number of the patterns to be excluded by the test pattern removing/undefined value setting means 105.

As explained above, if the test patterns having a smaller number of the undefined values are extracted earlier to be used for simulation, there arises a higher possibility that the number of the test patterns included in the test pattern set is decreased. Thus, the test pattern rearranging means 103 rearranges the test patterns to be in ascending order of the undefined values.

However, after repeating the rearrangement operation of the patterns by the test pattern rearranging means 103, there is a possibility that the order of the test patterns is not changed even if the rearrangement operation is performed. This is caused by the fact that the test pattern removing/undefined value setting means 105 sets many undefined values on the test patterns with a few undefined values and therefore, difference is difficult to be formed between the numbers of the undefined values in the pattern. If the order to the test patterns is not changed, there arises only the effect that the number of the target faults becomes larger (which is explained later) by sensitizing the undefined values by the undefined value sensitizing means 104. This means that the test patterns are difficult to be excluded or removed byte means 105.

To avoid such situation, the test pattern rearranging means 103 examines whether or not the order of the patterns included in the test pattern set has been changed in the step S102 in FIG. 8. IF the order of the patterns has not been changed, the means 103 assigns automatically-produced pseudo random numbers to the patters and then, it rearranges the patterns to be in ascending order of the random numbers thus assigned in the step S103.

(Undefined Value Sensitizing Means)

Next, the operation of the undefined value sensitizing means 104 is explained concretely below.

FIGS. 12A to 12D are circuit diagrams of a concrete logic circuit for which a test pattern set is generated (i.e., the target logic circuit).

Figure 12A:
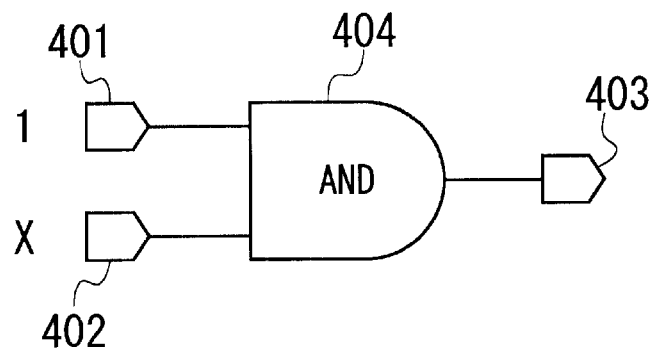
FIGS. 12A to 12D are circuit diagrams of a concrete logic circuit to be tested, showing the operation of the undefined value sensitization means of the test pattern set compression system according to the first embodiment of FIG. 5, respectively.
Figure 12B:
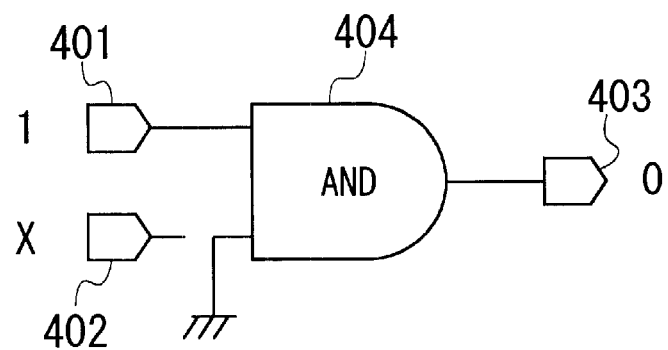

As shown in FIG. 12A, if a defined value "1" is inputted into an input terminal 401 and an undefined value "X" is inputted into another input terminal 402, an expected value outputted from an output terminal 403 of an AND circuit 404 (i.e., the output of the circuit 404) is an undefined value "X".

Here, it is supposed that a fault exists between the input terminal 402 and the circuit 404 so that the expected value of the output of the circuit 404 is a defined value "0". In this case, the circuit configuration is drawn to FIG. 12B. If a defined value "1" is inputted into the input terminal 401 and an undefined value "X" is inputted into the input terminal 402, the value of the output of the circuit 404 is a defined value "0" (not the expected value "X"). Since the output of the circuit 404 may have a defined value "0" or "1", the fault between the terminal 402 and the circuit 404 is not recognized. In other words, if the test pattern has a defined value "1" to the input terminal 401 and an undefined value "X" to the input terminal 402, the fault of the circuit 404 is unable to be detected.

Figure 12C:
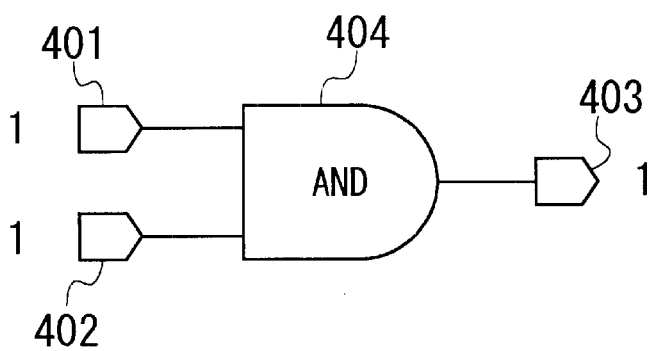

On the other hand, as shown in FIG. 12C, if a defined value "1" is inputted into the input terminal 401 and a defined value "1" is inputted into the input terminal 402, an expected value outputted from the output terminal 403 of the AND circuit 404 (i.e., the output of the circuit 404) is a defined value "1".

Figure 12D:
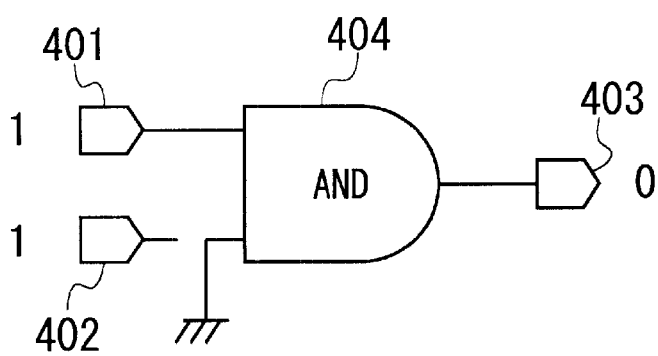

Supposing that a fault exists between the input terminal 402 and the circuit 404 so that the expected value of the output of the circuit 404 is "0", the circuit configuration is drawn to FIG. 12D. Even if a value "1" is inputted into the input terminal 401 and a value "1" is inputted into the input terminal 402, the value of the output of the circuit 404 is "0" (not the expected value "1"). Thus, the fault between the terminal 402 and the circuit 404 is recognized. In other words, if the test pattern has a defined value "1" to the input terminal 401 and a defined value "1" to the input terminal 402, the fault of the circuit 404 can be detected.

As described above, by changing an undefined value "X" to a defined value "0" or "1", the possibility that the undetectable fault before the value change can be made detected is raised. This means that the number of the faults excluded from the target faults in the step S205 in FIG. 9, which is performed by the test pattern removing/undefined value setting means 105, is increased. As a result the possibility that a judgment of no faults being detected is made in the step S203 in FIG. 9 is increased. Also, the number of the test patterns excluded in the step S206 becomes large.

The test pattern removing/undefined value setting means 105 sets the undefined value "X" on the individual unnecessary input signals in the step S204 in FIG. 9. Thus, the number of the undefined values in the test pattern is increased. Because of the increase of the undefined values "X", the test pattern merging means 106 easily merges the test patterns together, the reason of which is explained later.

(Test Pattern Removing/Undefined Value Setting Means)

Subsequently, the test pattern removal and undefined value setting operations by the test pattern removing/undefined value setting means 106 are explained below using a concrete example.

Figure 13A:
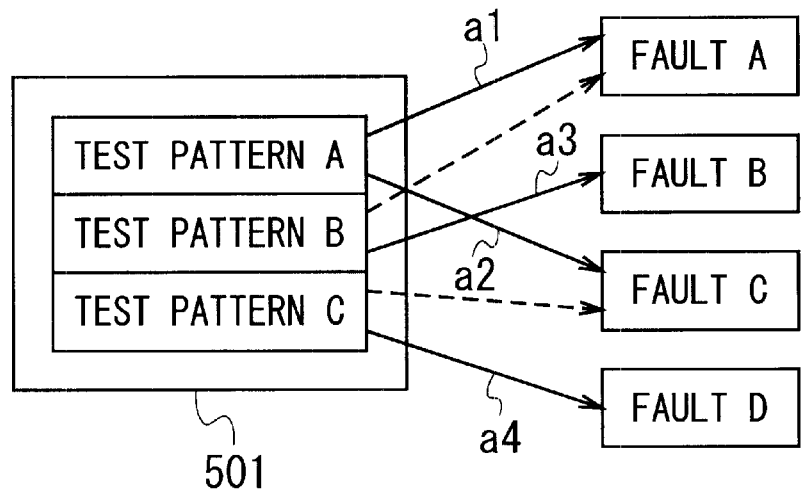
FIGS. 13A and 13B are schematic diagrams showing the operation of the test pattern removing/undefined value sensitizing means of the test pattern set compression system according to the first embodiment of FIG. 5, respectively.
Figure 13B:
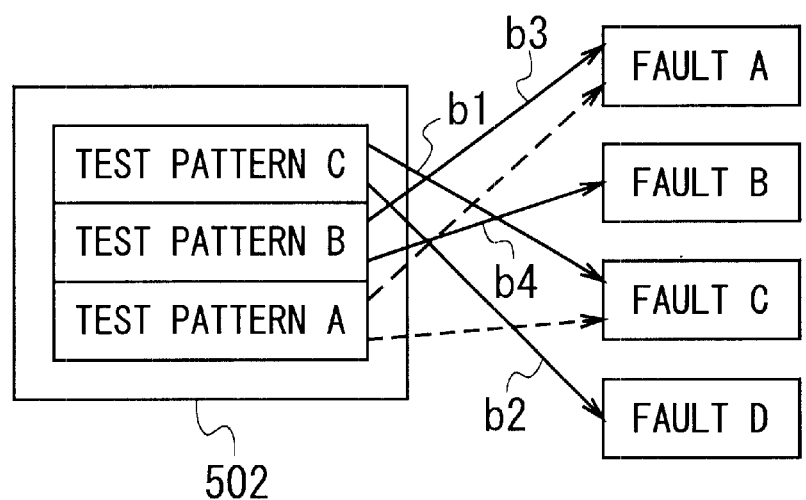

FIGS. 13A and 13B show the relationship between the test patterns and the faults to be detected in the fault simulation. Here, it is supposed that four faults A, B, C, and D are present in the target logic circuit, and that the test pattern A detects the faults A and C, the test pattern B detects the faults A and B, and the test pattern C detects the faults C and D.

The test patterns A, B, and C are arranged in alphabetical order in the test pattern 501 and in reversed alphabetical order in the test pattern 502.

When the test pattern set 501 shown in FIG. 13A is used, the test pattern removing/undefined value setting means 105 extracts initially the test pattern A (step S201 in FIG. 9) and then, the fault simulation operation is carried out using the pattern A. As a result, the faults A and C are detected, as shown by the arrows a1 and a2 in FIG. 13A, and these faults A and C thus detected are excluded from the target faults (steps S202, S203, and S205 in FIG. 9).

Since the test pattern set 501 includes the unextracted test patterns B and C (step S207), the test pattern removing/undefined value setting means 105 extracts the pattern B next time (step S201). If the fault simulation operation is performed using the pattern B, the faults A and B may be detected. However, the fault A has been already excluded and therefore, only the fault B is detected in this operation, as shown by the arrow a3. Thus, the fault B thus detected is excluded (steps S202, S203, and S205).

At this stage, the set 501 still includes the unextracted test pattern C (step S207). Thus, the test pattern removing/undefined value setting means 105 extracts the pattern C for the next fault simulation operation (step S201). If the operation is performed using the pattern C, the faults C and D may be detected. However, the fault C has been excluded and therefore, only the fault D is detected, as shown by the arrow a4. Thus, the fault C thus detected is excluded (steps S202, S203, and S205) and the process flow in FIG. 9 is finished (step S207).

In this case, as seen from the above description, all the test patterns A, B, and C detect any of the faults A to D; thus none of the patterns A, B, and C are removed or excluded in the steps S206.

Next, when the test pattern set 502 shown in FIG. 13B is used, the test pattern removing/undefined value setting means 105 extracts initially the test pattern C (step S201 in FIG. 9) and then, the fault simulation operation is carried out using the pattern C. As a result, the faults C and D are detected, as shown by the arrows b1 and b2 in FIG. 13B, and these faults C and D thus detected are excluded from the target faults (steps S202, S203, and S205 in FIG. 9).

Since the set 502 includes the unextracted test patterns B and A (step S207), the test pattern removing/undefined value setting means 105 extracts the pattern B (step S201) next time. Then, the fault simulation operation is performed using the pattern B and the faults B and A are detected, as shown by the arrows b3 and b4. Thus, the faults B and A thus detected are excluded (steps S202, S203, and S205).

At this stage, the set 502 still includes the unextracted test pattern A (step S207). Thus, the test pattern removing/undefined value setting means 105 extracts the pattern A for the next fault simulation operation (step S201). If the operation is performed using the pattern A, the faults A and B may be detected. However, these two faults A and B have already been excluded and therefore, no fault is detected at this time. As a result, the pattern A is found to be unnecessary to fault detection and is excluded from the set 502 (step S206).

As seen from the above explanation with reference to FIGS. 13A and 13B, although the test pattern sets 501 and 502 include the same test patterns A, B, and C, the number of excludable or removable test patterns in the step S206 varies due to the arrangement or order difference of the patterns A, B, and C. This is applicable to the sensitized test patterns by the undefined value sensitizing means 104 (where a defined value "0" or "1" has been assigned to the individual undefined values). In the compression system 100 according to the first embodiment of the present invention, the test pattern rearranging means 103 rearranges the test patterns in ascending order of the undefined values to facilitate the removal of the test patterns and therefore, the test pattern removing/undefined value setting means 105 tends to remove more test patterns.

(Test Pattern Merging Means)

FIGS. 14A to 14C show the merging method of the test pattern merging means 106 of the test pattern set compression system according to the first embodiment in FIG. 5, respectively.

The test pattern merging operation of the means 106 is carried out according to the merging rule shown in FIG. 14A. Specifically, (i) The undefined value "X" can be merged with any one of the values "0", 37 1", and "X".

(ii) The value "1" can be merged with the value "1".

(iii) The value "0" can be merged with the value "0".

(iv) The value "1" cannot be merged with the value "0" and vice versa.

As shown in FIG. 14A, the test pattern set 300 before merging includes four test patterns 301, 302, 303, and 304. Each of the patterns 301, 302, 303, and 304 has four input signals IS1, IS2, IS3, and IS4.

When the set 300 is used, first, the test pattern merging means 106 extracts the pattern 301 from the set 300 (step S301 in FIG. 10). Then, the means 106 examines whether or not the set 300 includes any test pattern or patterns that can be merged with the pattern 301 and recognizes the pattern 302 to be mergeable therewith (steps S302 and S303). Thus, as shown in FIG. 14B, the means 106 merges the pattern 302 with the pattern 301, forming a test pattern 305 (step 304).

Next, the test pattern merging means 106 extracts the pattern 303 from the remaining patterns in the set 300 (step S301). Then, the means 106 examines whether or not the set 300 includes any test pattern or patterns that can be merged with the pattern 303 and recognizes the pattern 304 to be able to be merged therewith (steps 302 and S303). Thus, as shown in FIG. 14B, the means 106 merges the pattern 304 with the pattern 303, forming a test pattern 306 (step 304).

Here, according to the merging rule in FIG. 14A, it is found that the input signals IS1 and IS3 are unable to be merged together in the test patterns 305 and 306 thus formed. This means that no further test pattern merging is impossible. Accordingly, the set 300 is converted to a test pattern set 300' including the two patterns 305 and 306, as shown in FIG. 14C.

Additionally, as seen from the merging rule in FIG. 14A, the undefined value "X" can be merged with any one of the values "0" and "1". This means that as the number of the values "X" included in the test pattern increases, the possibility that the pattern in question can be merged with other test pattern or patterns rises, which decreases the number of the test patterns included in the set. In the case of FIGS. 14A to 14C, the number of "X" in the pattern is increased by the test pattern removing/undefined value setting means 105 and therefore, the number of the test patterns included in the set can be reduced by the test pattern merging means 107.

(Advantages of Test Pattern Compression System)

With the test pattern compression system 100 according to the first embodiment of the invention, as explained as above in detail, the test pattern set prepared for detecting faults in the target logic circuit can be compressed efficiently. In other words, (a) the number of the test patterns included in the test pattern set can be reduced drastically, and (b) the compressing operation can be performed at high speed. The reason why theses advantages (a) and (b) are given is explained below in detail.

The above advantage (a) is given by the following first and second reasons.

The first reason is that the possibility that a test pattern or patterns included in the test pattern set is/are excluded by the test pattern removing/undefined value setting means 105 is raised by rearranging the patterns in the set to be in ascending order of the undefined values, and that the danger that none of the patterns in the set is removed or excluded by the means 105 is eliminated by using additionally the rearrangement of the test patterns according to the random numbers.

The second reason is that the possibility that a test pattern or patterns included in the test pattern set is/are merged with the other test pattern or patterns included therein by the test pattern merging means 106 is raised by rearranging the patterns to be in ascending order of the undefined values. This reason is explained in more detail below with reference to FIGS. 15A to 15D.

Figure 15A:
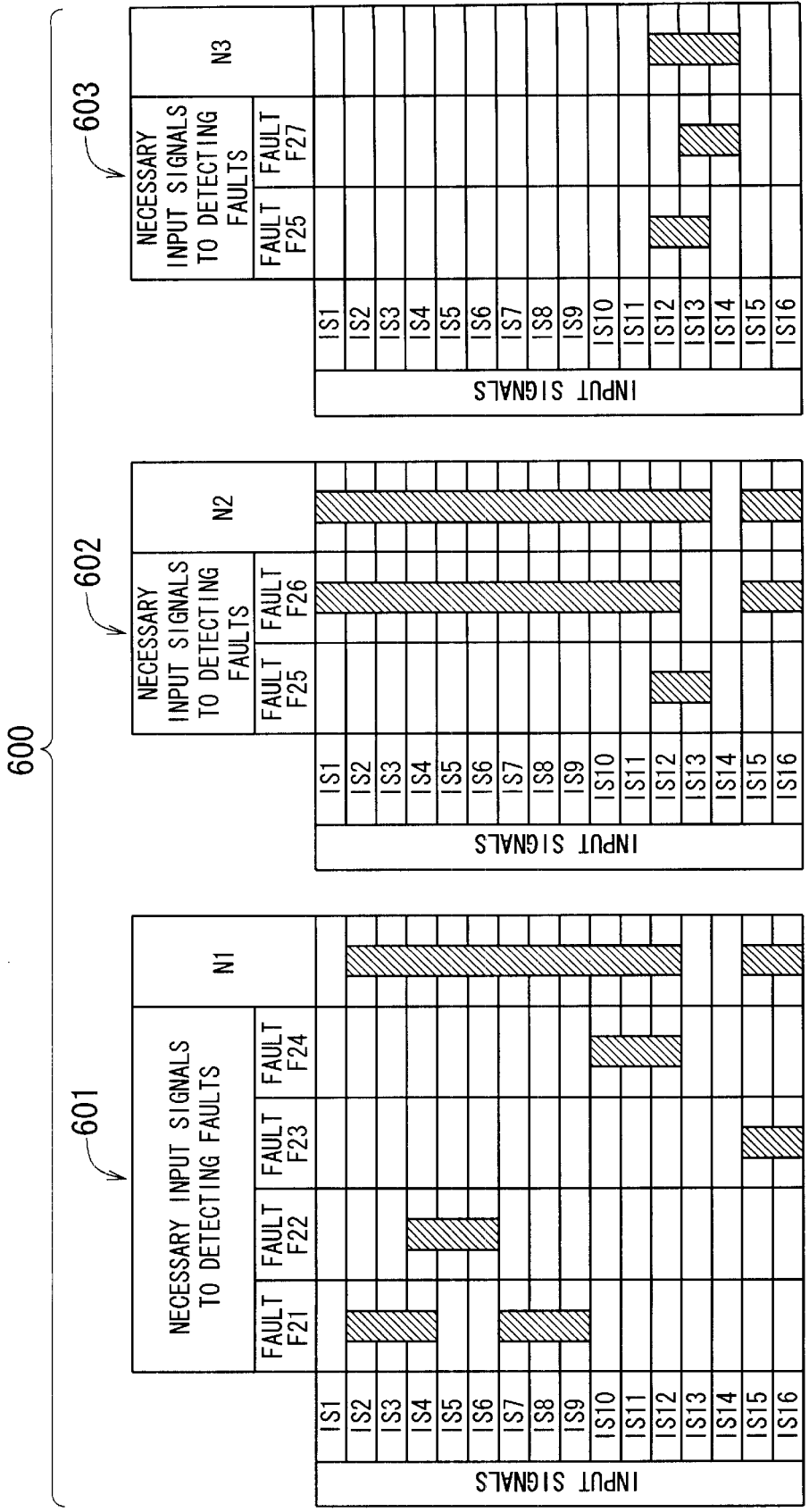

As shown in FIG. 15A, a test pattern set 600 comprises three test patterns 601, 602, and 603 arranged in this order. The set 600 is used to test a logic circuit (not shown) having 16 input terminals. Each of the patterns 601, 602, and 603 has 16 input signals IS1 to IS16 that are respectively applied to the 16 input terminals. The hatched regions in FIG. 15A denote the necessity of the signals for fault detection.

As shown in FIG. 15A, the pattern 601 detects four faults F21 to F24, the pattern 602 detects two faults F25 and F26, and the pattern 603 detects two faults F25 and F27.

In the pattern 601, 13 signals IS2 to IS12, IS15, and IS16 are needed to detect the four faults F21 to F24, where undefined values are assigned to the remaining three signals IS1, IS13, and IS14. In the pattern 602, 15 signals IS1 to IS13, IS15, and IS16 are needed to detect the two faults F25 and F26, where are undefined value is assigned to the remaining signal IS14. In the pattern 603, three signals IS12 to IS14 are needed to detect the two faults F25 and F27, where undefined values are assigned to the remaining 13 signals IS1 to IS11, IS15, and IS16.

The test pattern rearranging means 103 rearranges the initial order of the patterns 601, 602, and 603 to be in ascending order of the undefined values. Due to this rearrangement, as shown in FIG. 15B, the set 600 is converted to a test pattern set 600a having the order of the patterns 602, 601, and 603.

First, the test pattern removing/undefined value setting means 105 performs the fault simulation operation using the pattern 602 at the first position in the set 600a. In this simulation operation, the faults F25 and F26 are detected and excluded from the target faults to be detected in the subsequent fault simulation operations.

Next, the test pattern removing/undefined value setting means 105 performs the fault simulation operation using the pattern 601 at the second position in the set 600a. In this simulation operation, the faults F21 to F24 are detected and excluded from the target faults.

Furthermore, the test pattern removing/undefined value setting means 105 performs the fault simulation operation using the pattern 603 at the third position in the set 600a. However, the fault F25 has been excluded in the prior simulation operation. Thus, the pattern 603 is converted to a test pattern 604, as shown in FIG. 15C, thereby converting the set 600a to a test pattern set 600b. The set 600b corresponds to a set obtained by replacing the pattern 603 with the pattern 604 in the set 600a. In the simulation operation using the pattern 604 (not the pattern 603), only the fault F27 is detected. Thus, since the set 600a does not have unnecessary patterns to fault detection (i.e., no patterns are excluded), the set 600b (not the set 600a) is sent to the test pattern merging means 106 by the means 105.

The test pattern merging means 106 examines whether or not the set 600b includes a mergeable test pattern or patterns. As shown in FIG. 15C, the input signals IS2 to IS12, IS15, and IS16 are needed to detect the faults F21 to F24 in the pattern 601. Also, the input signals IS13 and IS14 are needed to detect the fault F27 in the pattern 604. It is seen that none of the input signals are overlapped between the patterns 601 and 604, which means that the pattern 604 can be merged with the pattern 601.

Thus, the test pattern merging means 106 merges the pattern 604 with the pattern 601, thereby forming a test pattern 605 and converting the set 600b to a test pattern set 600c, as shown in FIG. 15D.

For the sake of comparison, the same test pattern set 600 comprising the test patterns 601, 602, and 603 in FIG. 15A is applied to the prior-art test pattern compression system 700 in FIG. 1, the result of which is explained below.

Figure 16A:
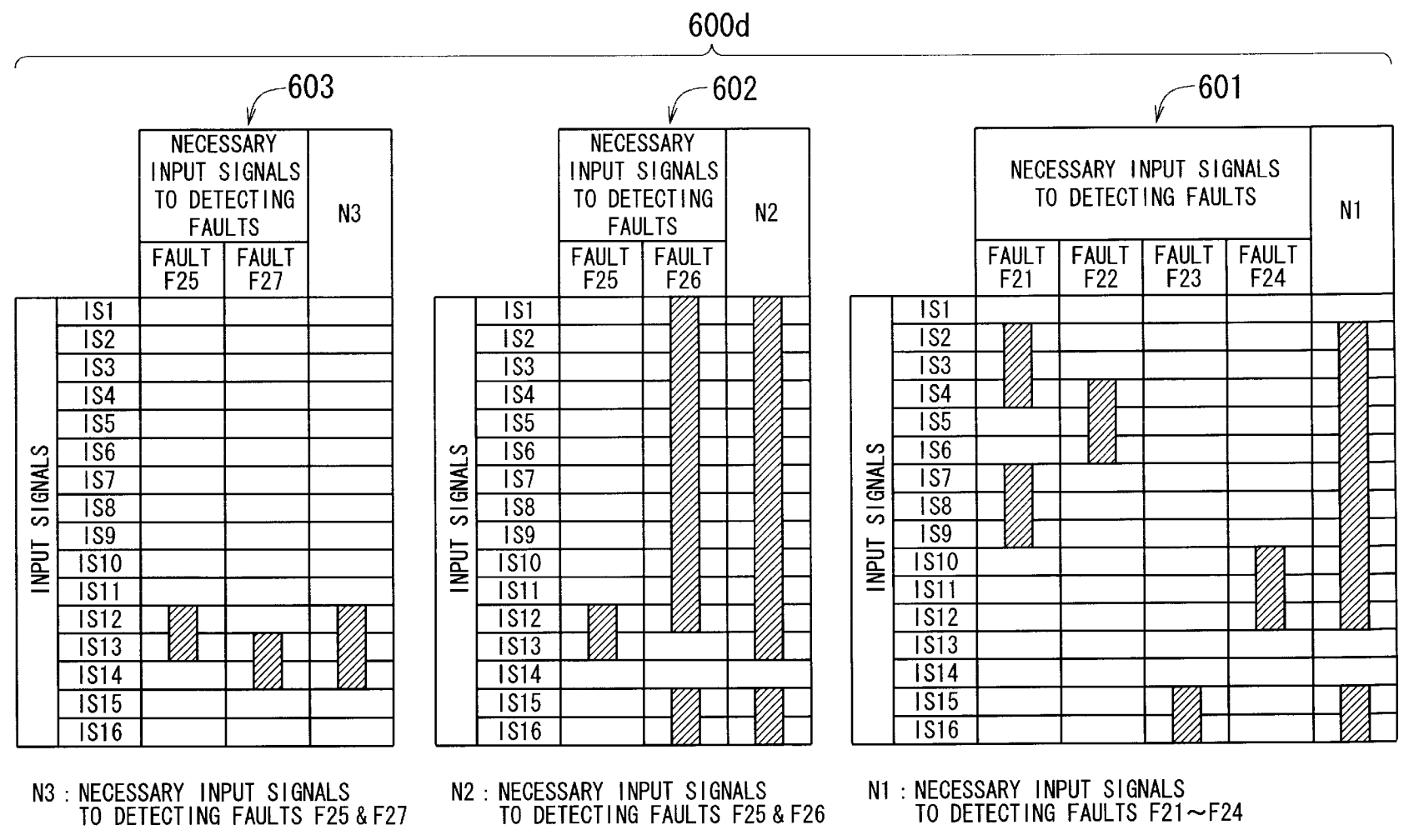

With the prior-art test pattern compression system 700, the test pattern rearranging means 703 reverses the initial order of the patterns 601, 602, and 603 in the set 600, thereby forming a test pattern set 600d as shown in FIG. 16A.

First, the test pattern removing/undefined value setting means 705 performs the fault simulation operation using the pattern 603 at the first position in the set 600d. In this simulation operation, the faults F25 and F27 are detected and excluded from the target faults.

Figure 16B:
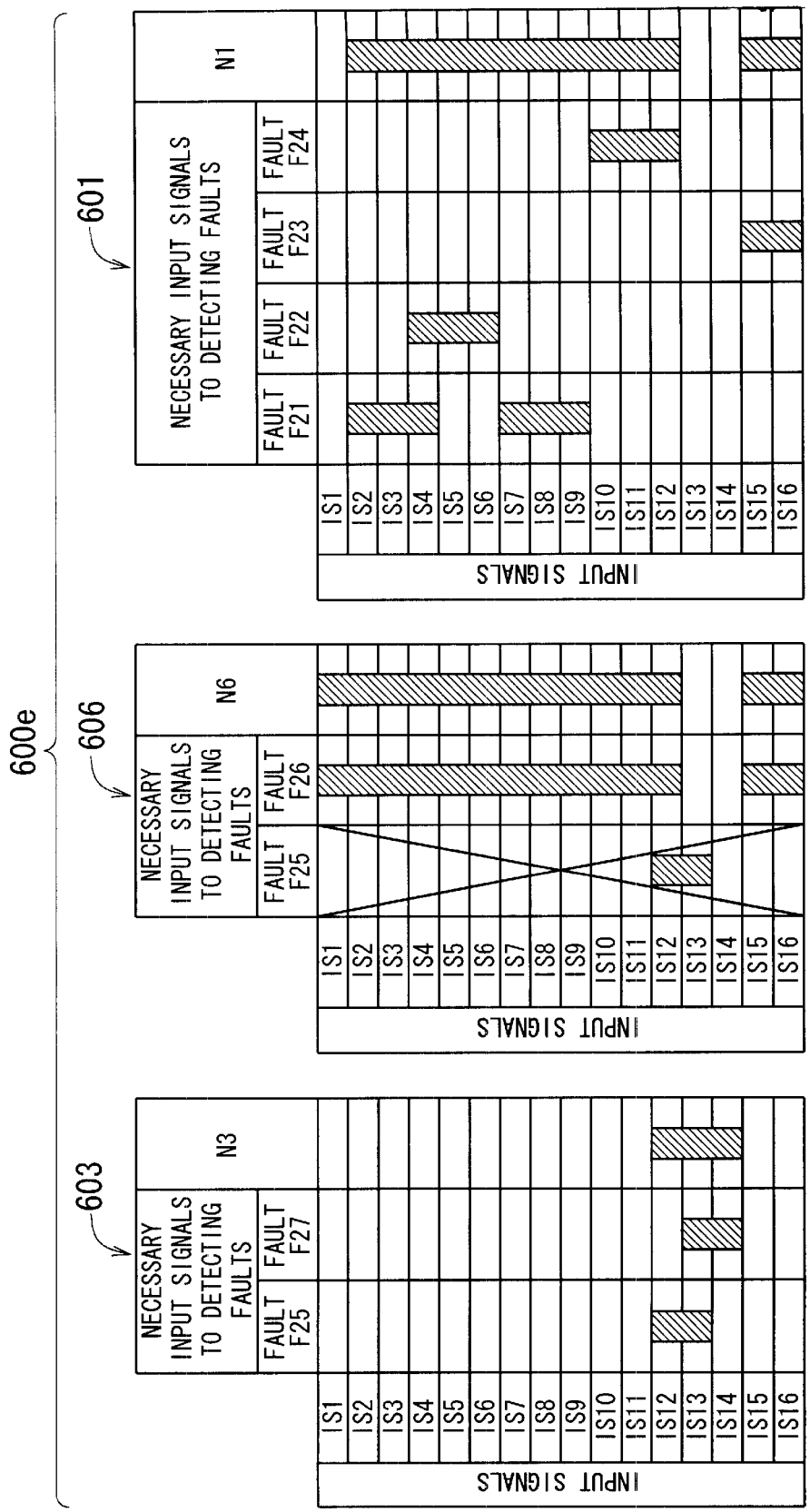

Next, the test pattern removing/undefined value setting means 705 performs the fault simulation operation using the pattern 602 at the second position in the set 600d. The fault F25 has been excluded from the target faults and therefore, the pattern 602 is converted to a test pattern 606 as shown in FIG. 16B, converting the set 600d to a test pattern set 600e. In the simulation operation using the pattern 606 (not the pattern 602), only the fault F26 is detected and excluded from the target faults.

Furthermore, the test pattern removing/undefined value setting means 705 performs the fault simulation operation using the pattern 601 at the third position in the set 600e. In this operation, the faults F21 to F24 are be detected.

Thus, the set 600e includes no unnecessary test patterns and no test patterns are excluded. As a result, the set 600e is sent to the test pattern merging means 706 by the means 705.

The test pattern merging means 706 examines whether or not the set 600e includes a mergeable test pattern or patterns. As shown in FIG. 16B, the input signals IS12 to IS14 are needed to detect the faults F25 and F27 in the pattern 603. Also, the input signals IS13 and IS14 are needed to detect the fault F26 in the pattern 606. The input signals IS2 to IS12, IS15, and IS16 are needed to detect the fault F26 in the pattern 601. It is seen that some of the input signals are overlapped among the patterns 603, 606, and 601, which means that none of the patterns 603, 606, and 601 can be merged together.

As seen from above comparison, unlike the prior-art test pattern compression system 700, it is seen that the test pattern compression system 100 according to the first embodiment of the invention can reduce the number of the test patterns due to merging operation.

The above advantage (b) that the compressing operation can be performed at high speed is given by the following reason.

The advantage (b) is due to the fact that the test pattern with less undefined values detects more faults than the test pattern with more undefined values. In other words, the number of the excluded faults from the target faults in the next faults simulation operation increases with the increasing number of the detectable faults. As a result, the latter the fault simulation operation is performed, the shorter the time necessary to fault detection becomes, thereby decreasing the total time necessary to overall fault detection. Thus, the compression of the test pattern set can be carried out at high speed.

Second Embodiment

The invention is not limited to the above-described first embodiment and includes various variations and various applications.

For example, with the test pattern compression system 100 according to the first embodiment, the test pattern rearranging means 103 performs the step S103 in FIG. 5 when the order of the test patterns is not changed in the step S101 in FIG. 8. However, the invention is not limited to this.

Figure 17:
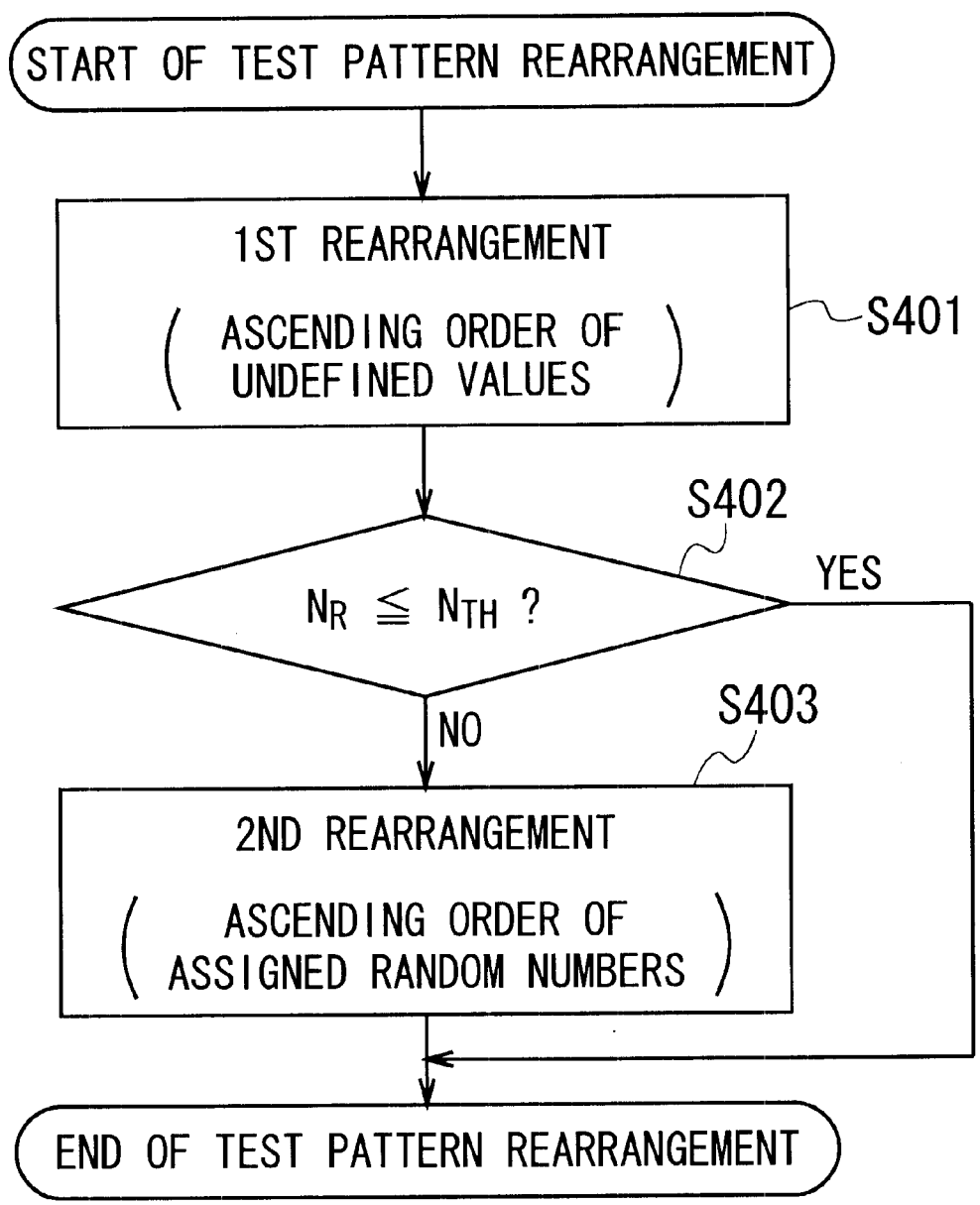
FIG. 17 is a flowchart showing the operation of the test pattern rearranging means in a test pattern set compression system according to a second embodiment of the invention.

For instance, the test pattern rearranging means 103 may perform the process steps according to the flowchart shown in FIG. 17. The steps S401 and 403 in FIG. 17 are the same as the steps S101 and S103 in FIG. 8, respectively. In the step S402, the number $N_R$ of the test patterns that have been changed in order by the test pattern rearranging means 103 in the step S401 is compared with a specific threshold value $N_{TH}$. If the result of the judgment is "yes", i.e., the number $N_R$ of the order-changed test patterns is equal to or less than the specific threshold value $N_{TH}$, the step S403 is carried out and the flow is finished. If the result of the judgment is "no", i.e., the number $N_R$ of the order-changed test patterns is greater than the specific threshold value $N_{TH}$, the flow is immediately finished without the step S403.

In the system according to the second embodiment, there is an additional advantage that the compressibility or compression performance can be enhanced by optimizing the threshold value $N_{TH}$ compared with the first embodiment.

Variations

In the above-described first and second embodiments, the test pattern compression system compresses the initial test pattern set TPS0 that has been generated by the initial test pattern generating means 102 according to the circuit/fault information CFI. However, any of the test pattern sets that have been generated for various logic circuits and stored in a library may be used as the test pattern set to be compressed.

Figure 18:
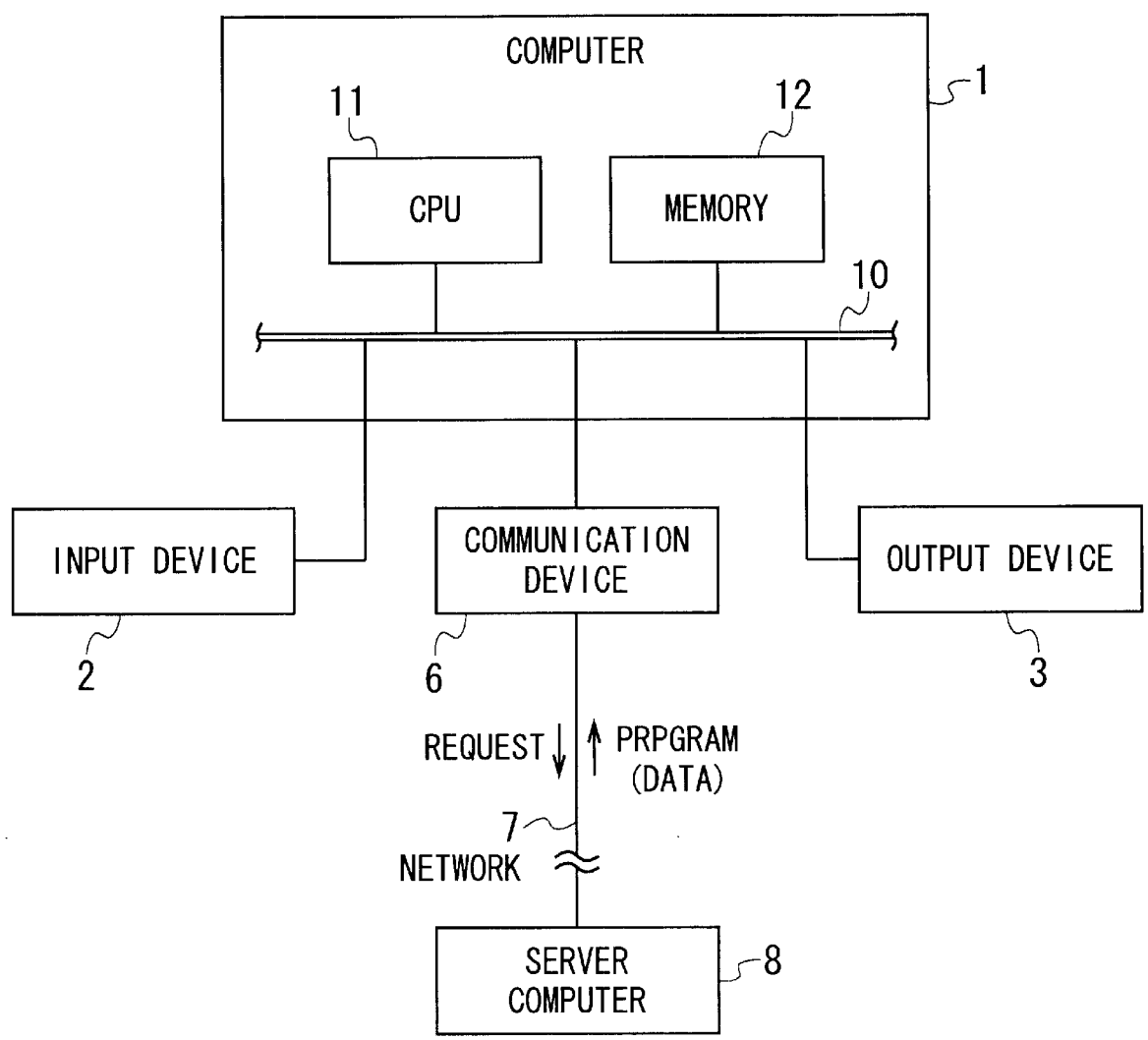
FIG. 18 is a functional block diagram showing the configuration of a network system used for the test pattern set compression system according to the first or second embodiment of FIG. 5 or 17.

In the above-described embodiments, the program performed by the CPU 11 in the computer 1 is transferred from the storing medium 5 to the memory 12 by the storing medium driving device 4. However, needless to say, the invention is not limited to this configuration. For example, the configuration shown in FIG. 18 may be used, in which a communication device 6 such as a modem is connected to the computer 1 and a server computer 8 is connected to the device 6 by way of a network 7. A request is sent from the client computer 1 to the server computer 8 through the device 6 and the network 7. Responsive to the request, the server computer 8 sends specific data including a program to the device 6. Then, the client computer 1 fetches the program thus sent from the device 6 through the bus 10 to thereby store the program in the memory 12.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A system for compressing a test pattern set including test patterns arranged in a specific order to detect faults in a logic circuit, comprising:
   (a) a test pattern rearranger subsystem that rearrange the test patterns included in the test pattern set to be in ascending order of a number of undefined values included in each of the patterns;
   (b) an undefined value sensitizer subsystem that assigns a defined value to the respective undefined values included in each of the patterns, sensitizing the patterns;
   (c) a test pattern remover subsystem that removes a fault-undetectable pattern or patterns from the patterns to which the defined value or values has/have been assigned by the undefined value sensitizer subsystem;
   (d) an undefined value setter subsystem that sets undefined values to a parameter in each of the patterns unnecessary to fault detection; and
   (e) a test pattern merger subsystem that merges fault-detectable patterns included in the set that have not been removed by the test pattern remover subsystem according to a specific rule.

2. The system according to claim 1, wherein the rearranger subsystem rearranges the test patterns in the test pattern set using random numbers.

3. The system according to claim 1, wherein the rearranger subsystem rearranges the test patterns in the test pattern set using random numbers when no order change of the patterns in the set occurs according to rearrangement in ascending order of the number of undefined values.

4. The system according to claim 1, wherein the rearranger subsystem rearranges the test patterns in the test pattern set using random numbers when an order change of the patterns in the set occurring according to rearrangement in ascending order of the number of undefined values is equal to or less than specific threshold value.

5. The system according to claim 1, wherein the rearranger subsystem rearranges an additional rearrangement operation to the patterns merged by the test pattern merger subsystem after a rearrangement operation.

6. The system according to claim 1, further comprising:
   a circuit/fault information input subsystem that inputs circuit information and fault information on the logic circuit; and
   a test pattern set generator subsystem that generates the test pattern set according to the circuit information and the fault information thus inputted.

7. A method for compressing a test pattern set including test patterns arranged in a specific order to detect faults in a logic circuit, comprising:
   (a) rearranging the order of the test patterns included in the test pattern to be in ascending order of a number of undefined values included in each of the patterns;
   (b) assigning a defined value to the respective undefined values included in each of the patterns, sensitizing the undefined values;
      the patterns with the sensitized undefined values containing a fault-undetectable patterns or patterns and a fault-detectable pattern or patterns for the logic circuits;
   (c) removing the fault-undetectable pattern or patterns from the set;
   (d) assigning an undefined value to a parameter unnecessary to fault detection in the fault-detectable pattern or patterns; and
   (e) merging some of the fault-detectable patterns that are mergeable together according to a specific rule.

8. The method according to claim 7, wherein the step (a) of rearranging the order of the test patterns is performed by rearranging the test patterns in the set using random numbers.

9. A computer program product having a computer readable medium and a computer program recorded thereon, the computer program being operable to compress a test pattern set including test patterns arranged in a specific order to detect faults in a logic circuit, said product comprising:
   (a) code that rearranges the order of the test patterns included in the test pattern to be in ascending order of a number of undefined values included in each of the patterns;

(b) code that assigns a defined value to the respective undefined values included in each of the patterns, sensitizing the undefined values;
  the patterns with the sensitized undefined values containing a fault-undetectable pattern or patterns and a fault-detectable pattern or patterns for the logic circuit;
(c) code that removes the fault-undetectable pattern or patterns from the set;
(d) code that assigns an undefined value to a parameter unnecessary to fault detection in the fault-detectable patterns or patterns; and
(e) code that merges some of the fault-detectable patterns that are mergeable together according to a specific rule.

10. The product according to claim 9, wherein the code (a) rearranges the order of the test patterns by rearranging the test patterns in the set using random numbers.

* * * * *